US005802207A

United States Patent [19]
Huang

[11] Patent Number: 5,802,207
[45] Date of Patent: Sep. 1, 1998

[54] SYSTEM AND PROCESS FOR CONSTRUCTING OPTIMIZED PROTOTYPES FOR PATTERN RECOGNITION USING COMPETITIVE CLASSIFICATION LEARNING

[75] Inventor: Yea-Shian Huang, Hsinchu, Taiwan

[73] Assignee: Industrial Technology Research Institute, Hsinchu, Taiwan

[21] Appl. No.: 497,030

[22] Filed: Jun. 30, 1995

[51] Int. Cl.$^6$ .................................................. G06K 9/62
[52] U.S. Cl. ........................... 382/224; 382/156; 382/159
[58] Field of Search ................................ 382/155–161, 382/187, 224–229; 395/23–24

[56] References Cited

U.S. PATENT DOCUMENTS

| | | | |
|---|---|---|---|
| 3,979,722 | 9/1976 | Sakoe | 340/146.3 |
| 4,284,975 | 8/1981 | Odaka | 340/146.3 |
| 4,658,429 | 4/1987 | Orita et al. | 382/36 |
| 4,685,142 | 8/1987 | Ooi et al. | 382/13 |
| 4,718,103 | 1/1988 | Shojima et al. | 382/13 |
| 4,731,857 | 3/1988 | Tappert | 382/9 |
| 4,903,312 | 2/1990 | Sato | 382/21 |
| 5,034,989 | 7/1991 | Loh | 382/13 |
| 5,050,219 | 9/1991 | Maury | 382/3 |
| 5,151,950 | 9/1992 | Hullender | 382/13 |
| 5,285,505 | 2/1994 | Kim et al. | 382/161 |
| 5,303,311 | 4/1994 | Epting et al. | 382/10 |
| 5,361,379 | 11/1994 | White | 382/36 |
| 5,422,961 | 6/1995 | Simard | 382/224 |
| 5,479,570 | 12/1995 | Imagawa et al. | 395/20 |
| 5,479,575 | 12/1995 | Yoda | 395/23 |
| 5,561,741 | 10/1996 | Wasserman | 395/23 |

OTHER PUBLICATIONS

Devijer & Kittler, Pattern Recognitiion: A Statistical Approach p. 409 (1982).

D. Lee & N. Srihari, *Handprinted Digital Recognition: A Comparison of Algorithms* Third International Workshop on Frontiers in Handwriting Recognition pp. 153–162 (1993).

G. Srikantan, *Gradient Representation for Handwritten Character Recognition* Third International Workshop on Frontiers in Handwriting Recognition. pp. 318–323 (1993).

L. Tu, W. Lin, Y. Chan & I. Shyu, *A PC Based Handwritten Chinese Character Recognition System* Thid International Workshop on Frontiers in Handwriting Recognition pp. 349–354 (1993).

Yan, Design and Implementation of Optimized Nearest Neighbour Classifiers for Handwritten Digit Recognition. Document analysis, 1993 Int'l Conference, pp. 10–13.

Yan, A comparison of Multi–Layer Neural Networks and Optimized Nearest Neighbor Classifiers for Handwritten Digit Recognition, Speech, image Processing, and Neural Networks, 1994 Int'l Symposium.

Yan, Transformation of optimized prototypes for handwritten digit Recognition, ICASSP '94 : Acoustics, Speech & Signal Processing Conference, pp. 625–628.

*Primary Examiner*—Leo H. Boudreau
*Assistant Examiner*—Bhavesh Mehta
*Attorney, Agent, or Firm*—Meltzer, Lippe, Goldstein, et al.

[57] ABSTRACT

A system and process for performing character recognition is disclosed wherein inputted characters are compared to prototypes maintained in a predetermined database of the system to determine the best matching character. To generate the prototype database for use in recognition, training character samples are inputted and classified and prototypes, having feature value vectors, are generated for each class. The prototypes are optimized to improve the recognition capabilities of the database. The prototype feature value vectors are updated by only small amounts for abnormal prototypes that are much closer to the nearest class M than to the true class I. In addition, the updating of the prototype feature value vectors is performed so as to minimize an error in the selection of the prototypes. Finally, the distance between a training character sample and a prototype is determined so that features which better distinguish one character from another have a greater weight in determining the distance than those features which do not distinguish one character from another as well.

10 Claims, 12 Drawing Sheets

FIG. 5

SYSTEM AND PROCESS FOR CONSTRUCTING OPTIMIZED PROTOTYPES FOR PATTERN RECOGNITION USING COMPETITIVE CLASSIFICATION LEARNING

RELATED APPLICATIONS

The subject matter of the present application is related to the subject matter of U.S. patent application Ser. No. 08/313,686, entitled "System and Method for Unconstrained On-Line Alpha-Numeric Handwriting Recognition," filed Sep. 27, 1994 for Lo-Ting Tu. Both this application and the above-noted application are assigned to the same assignee. The contents of the above-noted application are incorporated herein by reference.

FIELD OF THE INVENTION

The present invention relates to a system and method for recognizing inputted handwritten or printed characters by comparison to prototype character data precompiled and maintained in a database. In particular, the present invention relates to an optimized strategy for constructing such prototypes from inputted training character samples which optimized prototypes provide for greater accuracy in recognizing the inputted data to be recognized.

BACKGROUND OF THE INVENTION

Character recognition is often used in the course of inputting information which is in a humanly readably form (i.e., machine printed or handwritten form) rather than in electronic digital form. For instance, while many computers have a keyboard for receiving keypunch input, other computer systems have an optical scanner for receiving documentary input. Yet other computer systems have a pen-like stylus and tablet digitizer for receiving handwritten input. Such handwriting input devices may be provided for a number of reasons. For example, many users are more accustomed to inputting data via handwriting as opposed to keypunch. Additionally, a keyboard requires a large amount of space which cannot be accommodated in a small portable computer such as a personal digital assistant or PDA.

FIG. 1 shows a conventional character recognition system 10. The character recognition system may include a tablet and stylus 18, an optical scanner 16, or both. In the case of the tablet and stylus 18, the user moves the stylus about the tablet surface. The tablet and stylus 18 convert the user's movement of the stylus with respect to the tablet into digital binary data which graphically represents the movement. That is, if the user had used a pen and paper, the movement would have created marks on the paper. The stylus and table 18 produce pixilated images of such marks in the form of digital data.

In the case of an optical scanner 16, sheets, on which handwritten or machine printed characters are previously formed, are fed into the optical scanner 16. The optical scanner 16 generates digital binary data which graphically represent the characters on the sheets.

The stylus and tablet 18 or optical scanner 16 transfer the data to an I/O interface 14. The I/O interface 14, in turn, transfers the data onto a bus 12 of the system 10. The character recognition system 10 also includes a processor or CPU 20, a main memory 22, a disk memory 24 and an audio/video output device 26. Each of the devices 20, 22, 24 and 26 is connected to the bus 12 for purposes of transferring data to, and receiving data from, one of the other devices or the I/O interface 14. The audio/video output device 26 is for conveying information to a user in the form of images and sounds. To that end, the audio/video output device 26 may include a cathode ray tube or LCD display and loudspeakers. The main memory 22 and disk memory 24 are for storing data and programs. The processor 20 is for processing data. In particular, the processor 20 executes steps in conjunction with the other devices 12, 14, 16, 18, 22, 24 and 26 for recognizing characters from the inputted data.

FIG. 2 illustrates a conventional handwriting recognition process which may be executed by the character recognition system 10 of FIG. 1. In a first step 32, the inputted handwritten or machine printed characters are received. For instance, using the stylus and tablet 18, the user manually writes one or more characters. The stylus and tablet 18 transfer character data which graphically represents the written characters to the I/O interface 14. Alternatively, the user feeds sheets on which handwritten or machine printed characters have been previously handwritten or printed into the optical scanner 16. The optical scanner 16, in turn, transfers character data which graphically represents the handwritten or machine printed characters to the I/O interface 14. The I/O interface 14 transfers the character data via the system bus 12 to, for instance, the main memory 22.

Next in step 34, the processor 20 pre-processes the inputted character data stored in the main memory 22. For instance, the processor 20 may remove noise by discarding clusters of connected filled pixels having less than a minimum threshold area. The processor 20 may also smooth the graphical images of the inputted characters. Next, in step 36, the processor 20 optionally forms a skeleton image of each inputted character and then converts the skeleton images to enlarged contour images (i.e., thickens the lines of the skeleton images). Then, in step 38, the processor 20 segments the images of the characters (i.e., divides the images into subimages or zones) for purposes of extracting feature values from the character images. Herein, "feature" means any quantifiable graphical characteristic of an image which is useful for distinguishing the image of one or more characters from others. An illustrative segmentation technique is described in U.S. patent application Ser. No. 08/313,686 wherein the segmentation depends on the feature values to be extracted from the inputted characters. For instance, suppose the inputted character is the handwritten number "8". The graphical image of the inputted character "8" may be segmented as shown in FIGS. 3, 4 and 5. In FIG. 3, eight zones 321, 322, 326, 327, 341, 342, 346 and 347 are formed as shown. In FIG. 4, eight zones 352, 354, 356, 358, 372, 374, 376 and 378 are formed as shown. In FIG. 5, four zones 332, 334, 336 and 338 are formed as shown.

Next, in step 40, the processor 20 extracts a vector of feature values for each inputted character. U.S. patent application Ser. No. 08/313,686 provides examples of features which may be extracted from characters segmented as shown in FIGS. 3–5. These illustrative features are briefly described below. Illustratively, feature value vectors are extracted for the same features for each character.

Referring to FIG. 6, the extraction of stroke density function (SDF) feature values is illustrated. In evaluating the SDF, the processor 20 projects a number of inspection lines in each zone in which the SDF is evaluated. The processor 20 then counts the number of times the graphical image of the character crosses an inspection line within the zone. The total number of crossings is divided by the total number of inspection lines to produce the result of the SDF function (which, in turn, is the SDF feature value). Illustratively, the processor 20 does not evaluate the SDF in every zone. Rather, the processor 20 illustratively evaluates the SDF in the eight vertical zones 321, 322, 326, 327, 341, 342, 346 and 347 and in four horizontal zones 332, 334, 336, and 338 to produce 12 feature values.

Referring to FIG. 7, the extraction of peripheral background area (PBA) feature values is described. In determining the PBA, the processor 20 evaluates the following function:

$$PBA = \frac{\sum_{n'=1}^{N'} \lambda'_{n'}}{X'_{m'} \cdot Y'_{m'}} \qquad (1)$$

where n' is an index of points on either the horizontal (x') or vertical (y') axis which successively takes on each value from 1 to the maximum dimension N' of the character image rectangle on that axis. $\lambda'_{n'}$ is the distance in pixels from the $n'^{th}$ location to a filled pixel of the character image. As shown in FIG. 7, the processor 20 measures $\lambda'_{n'}$ perpendicularly from the corresponding axis. The variable m' takes on a value which indicates the particular zone for which the PBA function is evaluated. $X'_{m'}$ represents the horizontal width of the $m'^{th}$ zone and $Y'_{m'}$ represents the vertical height of the $m'^{th}$ zone.

The processor 20 evaluates the PBA in the vertical direction for each of the zones 321, 322, 326, 327, 341, 342, 346 and 347. The PBA is evaluated in the horizontal direction for the zones 352, 354, 356, 358, 372, 374, 376 and 378. Thus, 16 feature values are extracted.

Referring to FIG. 8, the extraction of the contour line length (CLL) feature values is described. In determining the CLL feature values, the processor 20 evaluates the following formula:

$$\Delta\lambda'_{n'} = \lambda'_{n'+1} - \lambda'_{n'} \qquad (2)$$

$$CLL_1 = \frac{\sum_{n'=1}^{N'} \Delta\lambda'_{n'}}{X'_{m'} + Y'_{m'}}, \text{ for each } \Delta\lambda'_{n'} < 0$$

$$CLL_2 = \frac{\sum_{n'=1}^{N'} \Delta\lambda'_{n'}}{X'_{m'} + Y'_{m'}}, \text{ for each } \Delta\lambda'_{n'} > 0$$

The variables m', n', $X'_{m'}$, $Y'_{m'}$ and $\lambda'_{n'}$ are as described above. The processor 20 obtains two CLL feature values, namely $CLL_1$ and $CLL_2$, for both of the vertical and horizontal zones 324, 328, 344 and 348. This produces 16 feature values.

Referring to FIG. 9, gradient feature values are extracted. First, the processor 20 assigns a direction code $Dir_{i',j'}$ to each pixel of the character image in the $i'^{th}$ column and $j'^{th}$ row of the character image. The variables i' and j' are indexes in the horizontal (x') and vertical (y') directions, respectively. The direction code corresponds to a direction that is normal to a tangent line at the pixel. As shown in FIG. 9, there are eight possible direction codes which can be assigned, each corresponding to a 45° angle direction, i.e., 0 for 337.5° to 22.5°, 1 for 22.5° to 67.5°, 2 for 67.5° to 112.5°, 3 for 112.5° to 157.5°, 4 for 157.5° to 202.5°, 5 for 202.5° to 247.5°, 6 for 247.5° to 292.5° and 7 for 292.5° to 337.5°. Thereafter, the processor 20 generates a vector of lengths $Len(Dir_{i',j'})$ in each zone using the following formulas:

$$Len = \sqrt{X^2 + Y^2} \qquad (3a)$$

-continued $$(Dir_{i,j} - 1) \cdot \frac{\Pi}{8} \leq \tan^{-1}\left(\frac{Y}{X}\right) < (Dir_{i,j} + 1) \cdot \frac{\Pi}{8} \qquad (3b)$$

$$\sum_{i'=1}^{I'} \sum_{j'=1}^{J'} \frac{Len_{i'j'}(Dir_{i,j})}{Bdd_{m'}(Dir_{i,j})} \text{ for each } Dir_{i,j} \qquad (3c)$$

where $Bdd_{m'}(Dir_{i',j'})$ represents the boundary width of the $m'^{th}$ zone which direction is normal to $(Dir_{i',j'})$, and wherein X' and Y' are values generated using the following kernels:

| -1 | 0 | 1 |     | 1  | 1  | 1  |
|----|---|---|-----|----|----|----|
| -1 | * | 1 |     | 0  | *  | 0  |
| -1 | 0 | 1 |     | -1 | -1 | -1 |

X'              Y'      (3d)

The processor 20 applies the kernels to each pixel of the character image prior to determining the length Len in the appropriate direction $Dir_{i',j'}$. The lengths $Len_{i',j'}$ are then combined as per equation (3c) to produce a single value for each of the eight directions $Dir_{i',j'}$. Thus, the processor 20 generates eight gradient feature values for each zone. Illustratively, the gradient feature values are extracted from each of the eight zones 352, 354, 356, 358, 372, 374, 376 and 378 thereby generating sixty-four feature values.

After extracting a feature value vector for an inputted character, the processor 20 executes step 42. In step 42, the processor 20 compares the feature value vector of each inputted character to feature value vectors contained in a database of predetermined feature value vectors. Illustratively, this database may be stored in the disk memory 24 or the main memory 22. The database contains at least one predetermined feature value vector for each model character of a set of model characters that can be recognized by the system 10. For instance, suppose the system 10 can recognize the letters of the English alphabet. In such a case, at least one predetermined feature value vector is maintained in the database for each letter of the alphabet. Based on these comparisons, the processor 20 determines the predetermined feature value vector which best matches the feature value vector of the inputted character. In step 44, the processor 20 outputs the model character to which the best matching predetermined feature value vector corresponds. For instance, the processor 20 can output the ASCII code of the model character, a predetermined character image of the model character, etc.

Many prior art modifications and enhancements have been proposed for character recognition. See, U.S. Pat. Nos. 5,151,950, 5,050,219, 5,034,989, 4,903,312, 4,731,857, 4,718,103, 4,685,142 and 4,284,975 and D. Lee & N. Srihari. *Handprinted Digital Recognition: A Comparison of Algorithms* THIRD INTERNATIONAL WORKSHOP ON FRONTIERS IN HANDWRITING RECOGNITION p. 153–162 (1993), G. Srikantan, *Gradient Representation for Handwritten Character Recognition* THIRD INTERNATIONAL WORKSHOP ON FRONTIERS IN HANDWRITING RECOGNITION p. 318–23 (1993) and L. Tu, W. Lin, Y. Chan & I. Shyu, *A PC Based Handwritten Chinese Character Recognition System* THIRD INTERNATIONAL WORKSHOP ON FRONTIERS IN HANDWRITING RECOGNITION p. 349–54 (1993).

As noted above, a typical character recognition system 10 compares the feature values extracted from inputted characters against a predetermined database of feature value vectors of model characters. Such a database may be organized in a number of ways. For instance, U.S. Pat. No. 5,050,219 (Maury) teaches a character recognition database organized according to a tree structure. Each leaf node of the tree contains a character which can be recognized. Each non-leaf node of the tree contains a particular one of a plurality of predetermined feature comparisons which should be performed on the inputted character feature values. Based on the results of the comparison at such a non-leaf node, the database is traversed to a particular attached child node. In the comparison step, the tree is traversed until a leaf node is reached. The character is then recognized as the character corresponding to the leaf node.

Other character recognition databases are flat. Such character recognition databases contain at least one vector of feature values for each model character to be recognized. The inputted character feature values are compared to each vector of feature values. The inputted character is then recognized as the model character corresponding to the vector of feature values which best match the feature value vector of the inputted character.

A flat character recognition database such as used above is conventionally generated as follows. Multiple training character samples are inputted to the system 10 of FIG. 1 for each model character which can be recognized. Feature values are then extracted for each training character sample. Typically, this results in too many feature value vectors to be practically stored or accessed for purposes of making comparisons. Therefore, the feature value vector database is compacted. To that end, the processor 20 illustratively organizes the characters into classes. For instance, the processor 20 initially forms one or more classes for each model character, and places each training character sample of each model character into a respective class. Thereafter, the processor 20 assigns one or more prototype feature value vectors for representing each class. For instance, the processor may form the mean feature value vector in each class, and assign the respective mean feature value vector to the class as a prototype feature value vector. This prototype feature value vector is said to represent a prototype, or virtual representative, character of the class. (U.S. patent application Ser. No. 08/313,686 proposes an alternative scheme for classifying and selecting prototype feature value vectors for each class.)

The selection of prototype feature value vectors in the above fashion may not be optimal. For instance, it is possible that a given training character sample of a particular class more closely matches the prototype of another class. Typically, the degree of matching of a prototype to a training character sample is determined by generating a sum of differences between the corresponding feature values of the prototype and the training character sample. This scalar sum is referred to herein as the distance between the two feature value vectors. A training character sample is said to be "nearest" the prototype having the feature value vector for which the smallest scalar sum is generated in comparison to the feature value vector of the training character sample. As a matter of convenience, the class of the training character sample is referred to herein as the true class and the class containing the best matching prototype is referred to as the nearest class to the training character sample. In a non-optimized database, the number of training character samples which are closer to a class than their true class may be unacceptably high. If too many training character samples are closer to a class other than their true class, the ability to correctly recognize an inputted character to be recognized is unacceptably degraded.

To avoid this problem, the selection of prototype feature value vectors is illustratively subsequently optimized. In the optimization process, the prototype feature value vectors may be adjusted so as to reduce the number of training character samples that are nearer to prototypes of classes other than their respective true classes.

A first conventional prototype optimization process is called the K_means process. See DEVIJER & KITTLER, PATTERN RECOGNITION: A STATISTICAL APPROACH p. 409 (1982). According to the K_means process, the processor 20 performs the following steps for each training character sample. The processor 20 assigns the training character sample to the nearest class, i.e., the class containing the prototype feature value vector that is nearest to the feature value vector of the training character sample. If this class to which the training character sample is to be assigned is not the currently assigned class of the training character sample, the processor 20 signals a semaphore indicating that a class change has occurred. The processor 20 also recalculates the prototype feature vectors (e.g., as the mean feature value vector) of each class. The processor 20 iterates through all training character samples as many times as necessary until a full iteration is completed in which the class change semaphore is not signaled.

A second optimization process is referred to as Linear Vector Quantization or LVQ2. See T. Kohonen, *The Self Organizing Man*, PROC. OF IEEE, vol. 78, no. 9, p. 1464–80 (1990). To explain this optimization process, the following notation is used:

| | |
|---|---|
| N | total number of features |
| i | a feature index from $1 \leq i \leq N$ |
| x | a training character sample feature value vector with components $x_1, \ldots, x_i, \ldots, x_N$ |
| K | the total number of classes of training character samples |
| $C_k$ | a $k^{th}$ class of training character samples |
| $B_k$ | the total number of prototypes in the $k^{th}$ class $C_k$ |
| j | a prototype index $1 \leq j \leq B_k$ for the $k^{th}$ class $C_k$ |
| $r^j_k$ | a feature value vector of the $j^{th}$ prototype of the $k^{th}$ class $C_k$ having components $r^j_{k1}, r^j_{k2}, \ldots, r^j_{kN}$ |
| $D(r^j_k, x)$ | the distance from feature value vector $r^j_k$ to the training character sample having the feature value vector x |
| $q_k$ | the index of the nearest prototype of class $C_k$ to the training character sample having the feature value vector x |
| l | the true class in which the training character sample having the feature value vector x should be classified |
| M | the nearest class to the training character sample having the feature value vector x, i.e., the class to which the nearest prototype is assigned |

The "distance" quantity $D(r^j_k, x)$ is given by:

$$D(r^j_k, x) = \sum_{i=1}^{N} (x_i - r^j_{ki})^2 \quad (4)$$

To determine the $(q_k)^{th}$ prototype "nearest" to the training character sample x, the following formula is used:

$$D(r^{q_k}_k, x) = \min_{j=1}^{B_k} D(r^j_k, x) \quad (5)$$

and the following formula may be used to determine the class M containing the $(q_k)^{th}$ prototype "nearest" to the training character sample x:

$$D(r^{q_M}_M, x) = \min_{k=1}^{K} D(r^{q_k}_k, x) \quad (6)$$
$$= \min_{k=1}^{K} \min_{j=1}^{B_k} D(r^j_k, x)$$

The LVQ2 process is then as follows. The processor 20 executes the following steps for each training character sample feature value vector x. The processor 20 determines the class M nearest to the training character sample with the feature value vector x. The processor 20 then compares M to I. If M=I then the training character sample is nearest to a prototype in its true class I. In such a case, the processor 20 does not update the prototype feature value vectors and skips to processing the next training character sample feature value vector. However, if M≠I, then the processor 20 updates both the nearest prototype feature value vector of the wrong class M so as to move it away from the training character sample, and the nearest prototype of the true class I, so as to move it nearer to the training character sample. To move the nearest prototype of the (wrong) class M away from the training character sample, each $i^{th}$ feature value of the prototype feature value vector $r^{qM}{}_M$ is changed by the following quantity:

$$\Delta r_{Mi}^{qM} = -\alpha \cdot (x_i - r_{Mi}^{qM}) \qquad (7a)$$

where α is a predetermined constant or function. Likewise, to move each prototype of class I closer to x, each $i^{th}$ feature value vector of the prototype feature value vector $r^{qi}{}_I$ is changed by the following quantity:

$$\Delta r_{Ii}^{qI} = \alpha \cdot (x_i - r_{Ii}^{qI}) \qquad (7b)$$

In general, LVQ2 optimizes the prototypes and provides better results than the K_means process. However, it is desirable to further improve the prototype optimization process. In particular, an analysis of the LVQ2 process reveals the following shortcomings which constrain the optimization:

(1) The optimization criteria of equations (7a) and (7b) do not directly correspond to the minimization of prototype selection error.

(2) Some training character samples may be abnormal. Such training character samples are not very suitable for classification and tend to change the prototypes in a considerably deviant fashion. However, LVQ2 does not account for such training character samples and in fact allows such abnormal training character samples to make a drastic change to the prototypes. In particular, whenever M≠I, the prototypes are updated according to the distance of the prototype feature value vector from the training character sample feature value vector. This manner of updating does not have any safeguard for determining if such a drastic change to the prototypes was generated because the prototypes are in error or because the training character sample is abnormal.

(3) LVQ2 treats all features equally in determining the distance from the training character sample to the prototypes. However, some features better distinguish characters from each other than other features. Equation (4) do not account for the difference in ability amongst the features to distinguish one character from another.

It is therefore an object of the present invention to overcome the disadvantages of the prior art.

SUMMARY OF THE INVENTION

According to one embodiment, a process is provided for recognizing characters including an optimization process called the Competetive Classification Learning (CCL) process. The CCL process can be executed in a system which has one or more processors, a memory connected to the processor, and a character input device, such as a stylus and tablet or optical scanner for receiving inputted characters.

The process illustratively includes the steps of receiving inputted characters at the character input device and, using the one or more processors, comparing each inputted character to prototype characters in a database (which input characters and database are stored in the memory) to determine the best matching prototype character.

The one or more processors illustratively generate the database of prototype characters by inputting training character samples of model characters, extracting a feature value vector for each inputted training character sample, organizing the training character samples into classes and selecting at least one prototype feature value vector for each class. According to the CCL process, the one or more processors illustratively optimize the selection of prototype feature value vectors to improve the recognition ability of the character recognition system. Illustratively, the optimization of the character recognition is performed in accordance with one or more of the following criteria:

(1) the step of updating is performed so that each iterative updating of the prototype feature value vectors minimizes an error in selecting the prototypes, (2) the step of updating is performed so that each iterative updating of the prototype feature value vectors reduces the effect of abnormal training samples which are unsuitable for classification, and (3) the step of updating is performed so that features which better distinguish one character from another have a greater contribution in determining the distance from the training character samples to the prototypes than features with a lesser capability to distinguish characters.

To meet these criteria, the one or more processors perform the following steps.

For each training sample:

(a) determine the distance $Y^j{}_k$ between each prototype feature value vector and the training character sample using the formula:

$$y_k^j = \sum_{i=1}^{N} \frac{(x_i - r_{ki}^j)^2}{\theta_i} \qquad (8)$$

where:

N the total number of features x a training character sample feature vector having components $x_1, \ldots, x_i, \ldots, x_N$ K the total number of classes of training character samples j a prototype index j≧1 for the $k^{th}$ class $r^j{}_k$ a feature value vector of the $j^{th}$ prototype of the $k^{th}$ class having components $r^j{}_{k1}, r^j{}_{k2}, \ldots, r^j{}_{kN}$ $y^j{}_k$ the distance from the $j^{th}$ prototype of the $k^{th}$ class to the training character sample x $\theta_i$ a normalization factor for the feature i (b) determine the minimum distance $z_k$ from the training character sample x to the nearest prototype $q_k$ of each class k using the formula:

$$z_k = \min_{j=1}^{B_k} y_k^j \qquad (9)$$

where:

$B_k$ the total number of prototypes in the $k^{th}$ class $q_k$ the index of the prototype nearest to x $z_k$ the distance from the nearest prototype of the class k to the training character sample.

(c) Determine $O_M$ and $O_I$ by evaluating the formulas:

$$O_M = y_{Mi}^{qM} = \min_{j=1}^{B_M} \sum_{i=1}^{N} \frac{(x_i - r_{ji}^k)^2}{\theta_i} = \min_{k=1}^{K} z_k \quad (9a)$$

$$O_I = y_{Ii}^{qI} = \min_{j=1}^{B_I} \sum_{i=1}^{N} \frac{(x_i - r_{ji}^k)^2}{\theta_i} \quad (9b)$$

where:

I the true class in which the training character sample having the feature value vector x should be classified
M the class containing the nearest prototype to the training character sample having the feature vector x
$B_M$ the total number of prototypes in the class M
$B_I$ the total number of prototypes in the class I
$O_I$ the distance from the training character sample x to the nearest prototype in the true class I
$O_M$ the distance from the training character sample x to the nearest prototype in the nearest class M.

(d) If $O_M = O_I$ then M=I and no prototypes are updated for this iteration. However, if $O_M \neq O_I$ then M≠I and the prototypes are updated. Each $i^{th}$ feature value vector of the respective nearest prototypes of M and I are updated according to the following formulas:

$$\Delta r_{Mi}^{qM} = -\eta(n) e^{\frac{O_M - O_I}{A(n)}} \frac{(x_i - r_{Mi}^{qM})}{\theta_i} \quad (10a)$$

$$\Delta r_{Ii}^{qI} = \eta(n) e^{\frac{O_M - O_I}{A(n)}} \frac{(x_i - r_{Ii}^{qI})}{\theta_i} \quad (10b)$$

Furthermore, each normalization factor $\theta_i$ for each $i^{th}$ feature is updated according to the following formula:

$$\Delta \theta_i = \mu(n) e^{\frac{O_M - O_I}{A(n)}} \frac{(x_i - r_{Ii}^{qI})^2 - (x_i - r_{Mi}^{qM})^2}{\theta_i^2} \quad (11)$$

where:

n the iteration number over all training character samples
A(n) a monotonically decreasing bandwidth function
η(n) a monotonically decreasing feature value weighting function
μ(n) a monotonically decreasing feature normalization factor weighting function The bandwidth parameter A(n) is sometimes referred to as the width of the receptive field of the sigmoid function exp[$O_M - O_I$/A(n)] which governs the size of the active area of the sigmoid function. (That is, a large value of A(n) causes the sigmoid function to rise slowly while a small value of A(n) causes the sigmoid function to rise more rapidly.) The learning rate functions η(n) and μ(n) are selected to have the largest effect initially when n=0 and to iteratively have a smaller effect as n increases thereby effecting a smaller "learning" regarding prototypes and normalization factors during each successive iteration.

Note that in equations (10a) and (10b) the term exp[($O_M - O_I$)/A(n)] controls the updating of the prototypes. The monotonically decreasing bandwidth parameter A(n) causes the updating of prototypes to gradually decrease each iteration. Specifically, for a given $O_M$ and $O_I$, as n increases the change to the prototypes decreases. This is desirable because as n increases (i.e., after successive iterations) the prototypes converge to their optimal values. It is therefore desirable to prevent large changes in the prototypes after many iterations have occurred. Otherwise, such large changes could cause the prototypes to deviate from their optimal values. As a result, by causing the updating of prototypes to depend on the bandwidth parameter as in equations (10a) and (10b), the prototypes are updated in accordance with the minimization of error in the selection of prototypes.

The dependence of the updating on the quantity $O_M - O_I$ ensures that abnormal prototypes, that are not suitable for character recognition, have a minimized effect on the updating of the prototypes. When $O_M \neq O_I$ but $O_M$ is close in value to $O_I$, the prototypes may be significantly changed. As the value of $O_M$ departs from the value of $O_I$ the change to the prototypes decreases. Thus, when $O_M \neq O_I$ but $O_M$ is much smaller than $O_I$, little change, if any, may be made to the prototypes. Such is the case where the training character sample is relatively close to the nearest prototype of the wrong class M yet rather distant from the nearest prototype of the true class I. However, whenever this occurs, the training character sample is probably abnormal and not suitable for character recognition. Thus, the desired result occurs, namely, minimizing the updating of the prototypes for abnormal training character samples.

As per equation (8), the distance calculation uses a normalization factor $\theta_i$ selected for each feature. Furthermore, in equation (11), two terms control the adjustment of the normalization factor, namely, $(x_i - r_{Ii}^{qI})^2$ and $(x_i - r_{Mi}^{qM})^2$. The first term is the difference between the $i^{th}$ feature values of the training character sample and the nearest prototype of the true class I. The second term is the difference between the $i^{th}$ feature values of the training character sample and the nearest prototype of the nearest class M. When $O_M \neq O_I$ and the first term is larger than the second term, $\theta_i$ is increased so as to reduce the contribution of this $i^{th}$ feature on the distance determination. On the other hand, when $O_M \neq O_I$ and the first term is smaller than the second term, $\theta_i$ is decreased, thereby increasing the contribution of this $i^{th}$ feature on the distance determination. As a result, features which better distinguish training character samples have a greater contribution in determining the distance between feature value vectors.

Illustratively, a system is provided for performing the above character recognition process, in particular, the optimization of prototypes. Illustratively, such a system comprises a neural network processor with a plurality of interconnected processing nodes that are hierarchically organized into plural layers. Illustratively, an input layer is provided with N nodes, each of which receives a respective feature vector value of a training character sample. A first hidden layer is also illustratively provided including J processing nodes, wherein J equals the total number of prototypes of all of the K classes. That is:

$$J = \sum_{k=1}^{K} B_k$$

Each first hidden layer processing node corresponds to a particular one of the prototypes and receives each feature value inputted from each input processing node. In response, each $j^{th}$ first hidden layer processing node determines the distance $y^j$ between the inputted training character sample and the respective $j^{th}$ prototype. Illustratively, a second hidden layer is provided with K processing nodes, including one processing node corresponding to each $k^{th}$ class. Each $k^{th}$ second hidden layer processing node illustratively is connected to only those first hidden layer processing nodes corresponding to prototypes of the associated $k^{th}$ class. Each $k^{th}$ second hidden layer processing node receives the $B_k$ distances $y^j$ between the inputted training character sample and the prototypes of the $k^{th}$ class outputted by the first hidden layer processing nodes connected thereto. In response, each $k^{th}$ second hidden layer processing node determines the minimum distance $z_k$ of the $B_k$ distances $y^j$ inputted thereto. Finally, an output layer is provided with two processing nodes, which are both connected to each pre-processing node of the second hidden layer. A first one of the output layer processing nodes determines which of the minimum distances $z_k$ is the smallest overall. The first output layer processing node outputs this smallest minimum distance $z_k$ as $O_M$. Furthermore, the first output layer processing node outputs the class of the second hidden layer node which outputted this smallest minimum distance as M. A second one of the output processing nodes outputs the true class I of the training character sample and the distance $z_I$ of the second layer hidden node corresponding to class I. Thus, the neural network processor simplifies the determination of M, I, $O_M$ and $O_I$.

In short a system and process for optimizing the prototypes of a character recognition database is disclosed. The optimization according to the present invention provides an improved database against which inputted characters to be recognized may be compared.

BRIEF DESCRIPTION OF THE DRAWING

Figure 5:
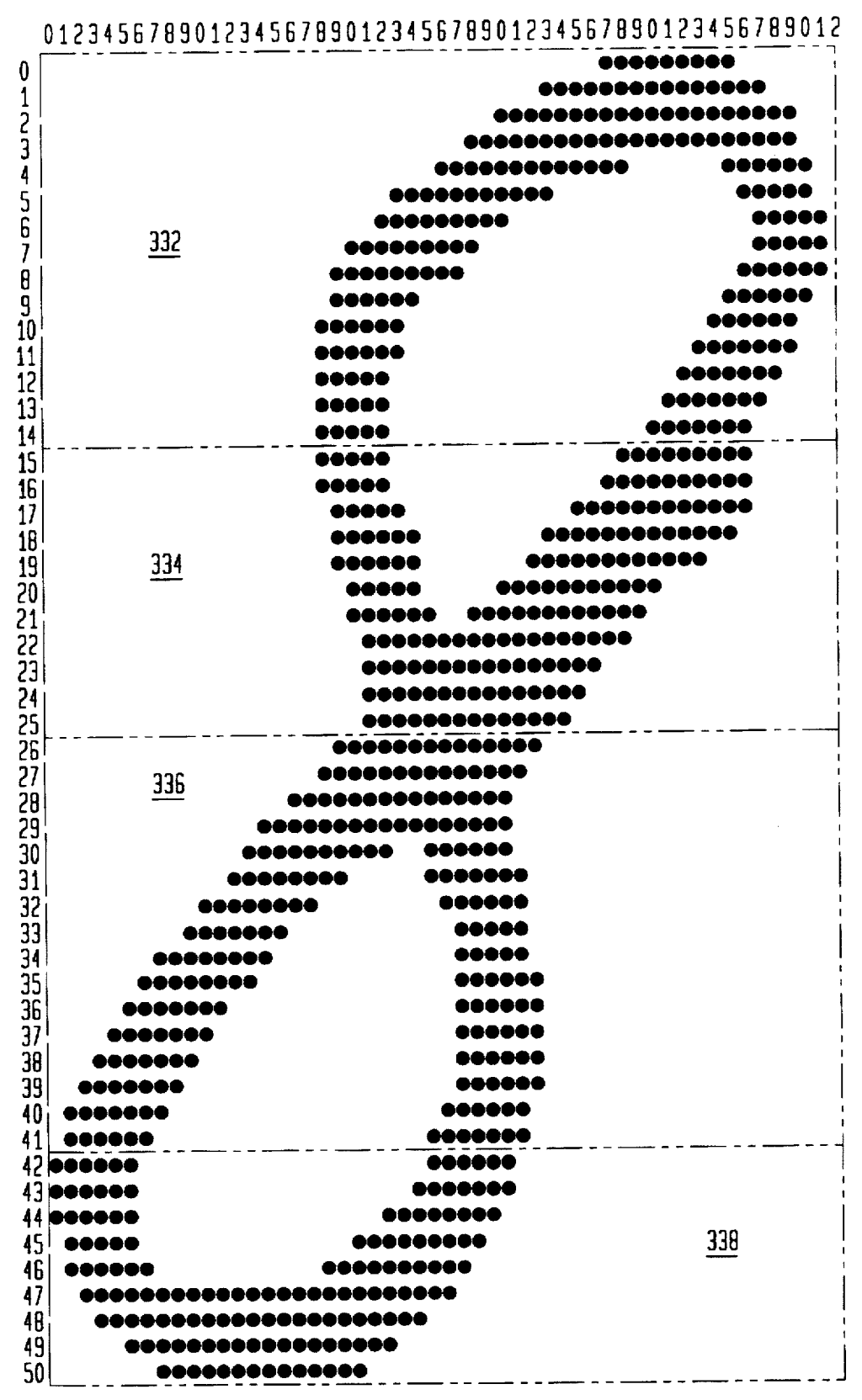

FIGS. 3–5 illustrates character segmentation.

DETAILED DESCRIPTION OF THE INVENTION

Figure 1:
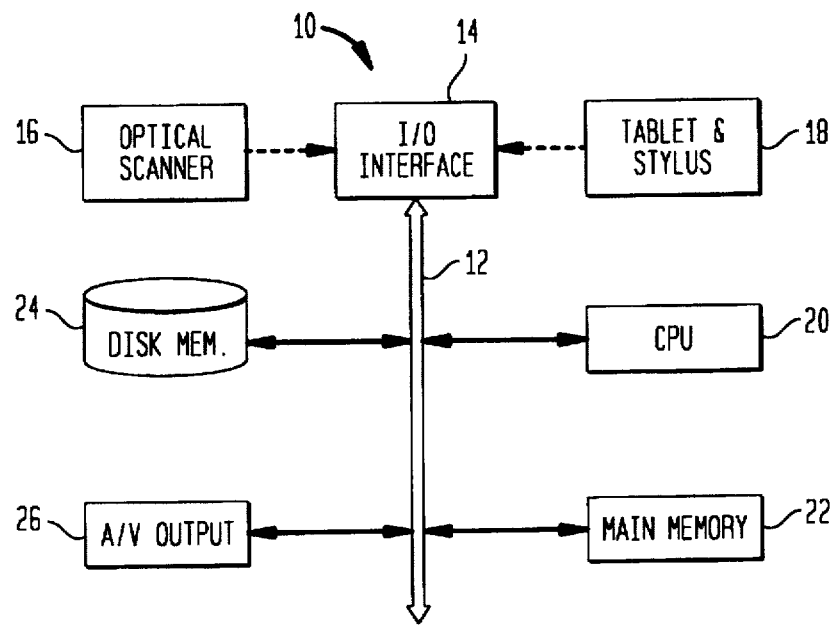
FIG. 1 depicts a conventional character recognition system.
Figure 2:
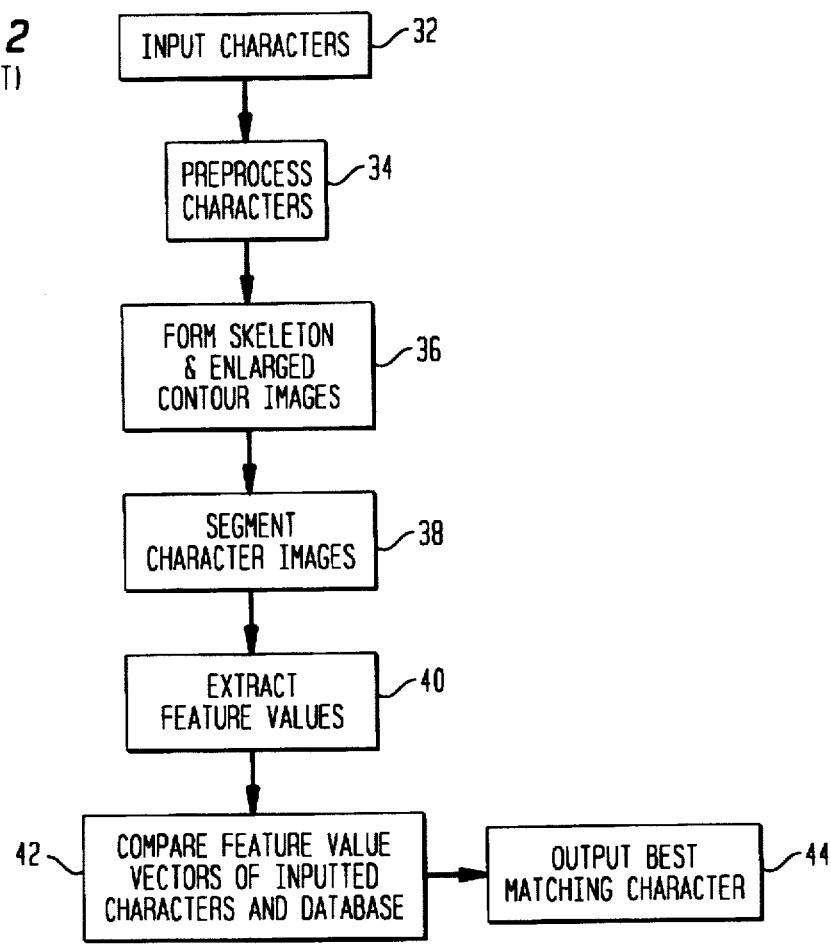
FIG. 2 is a flowchart which schematically illustrates a conventional character recognition process.
Figure 3:
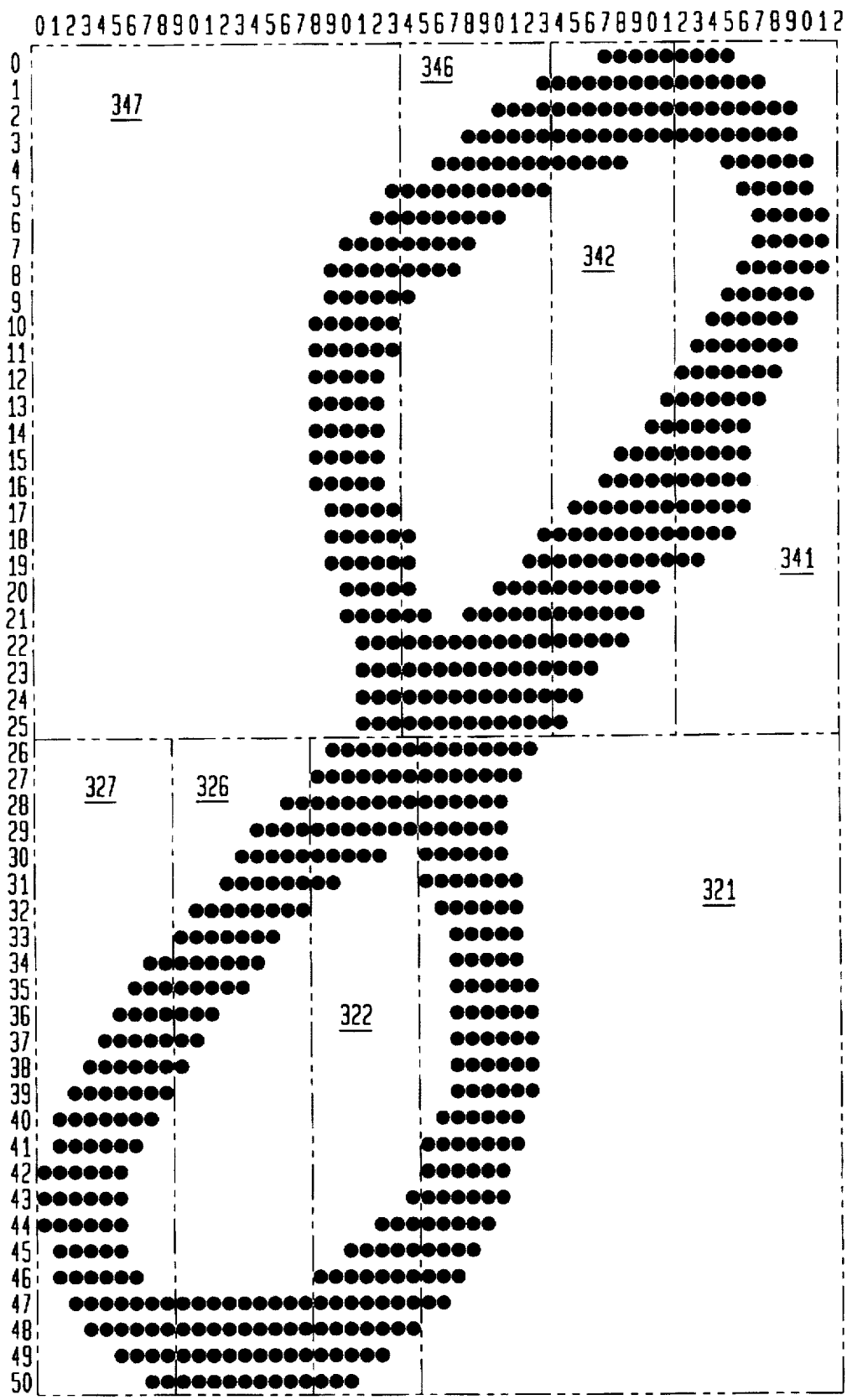
Figure 4:
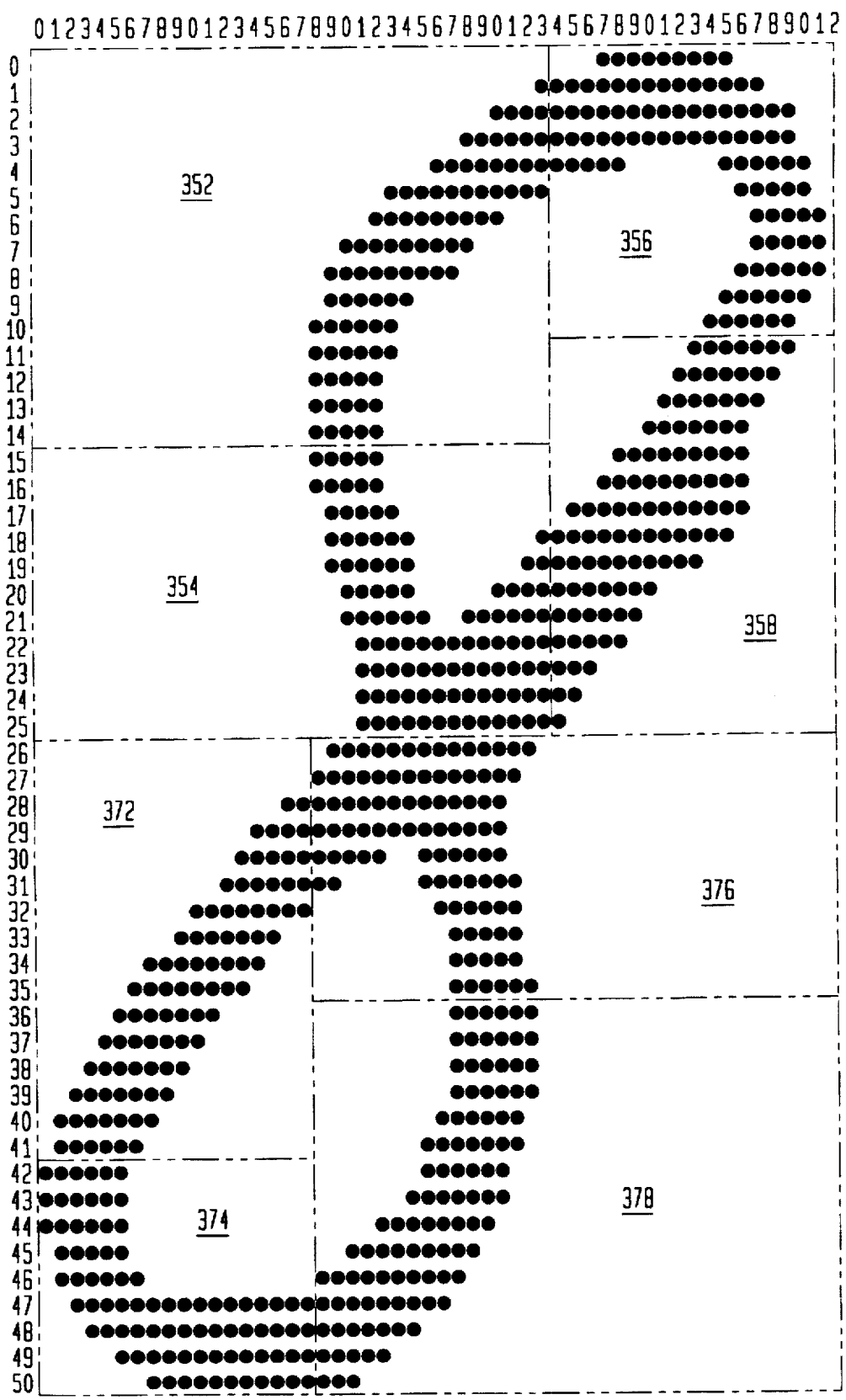
Figure 6:
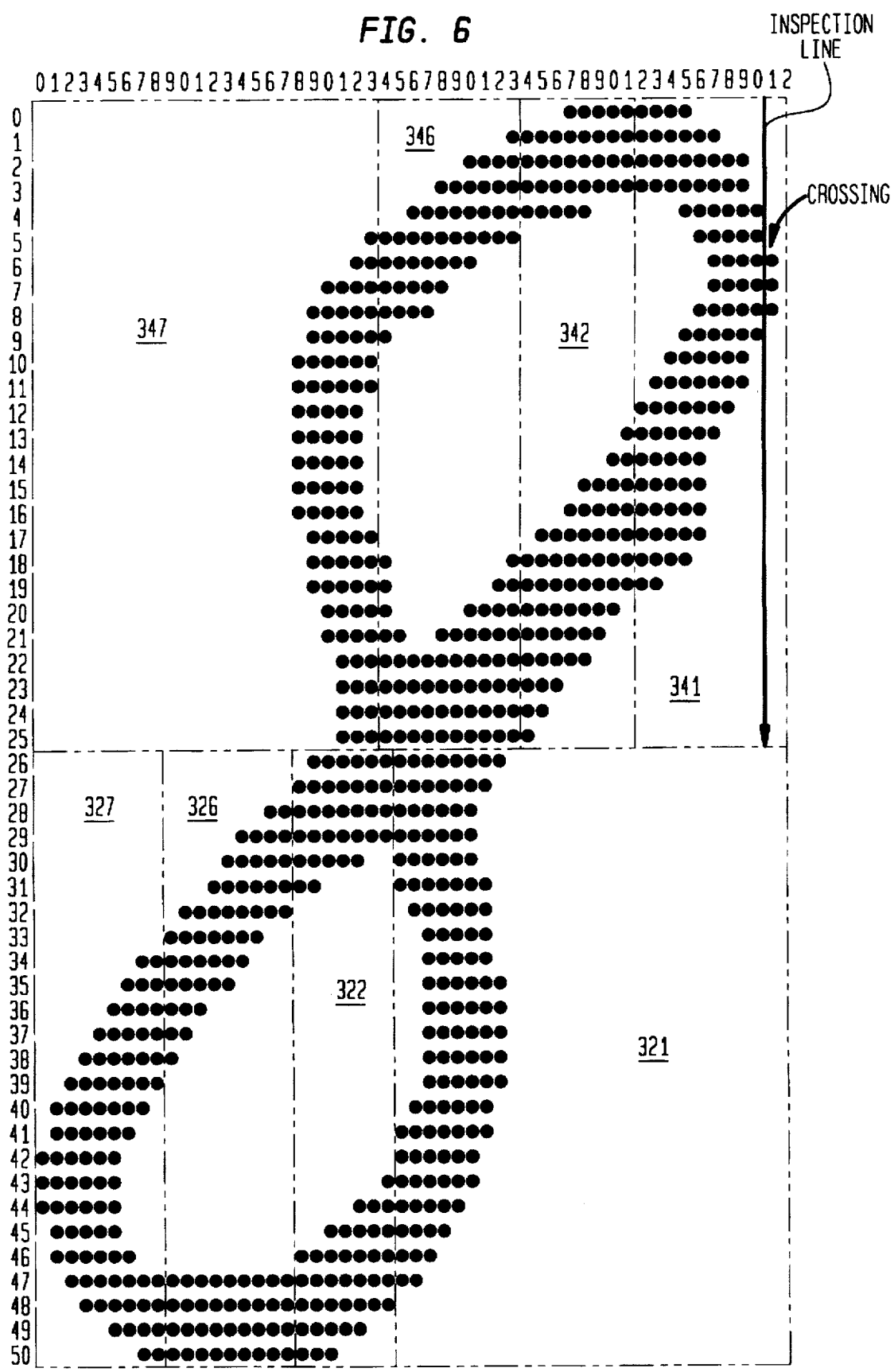
FIGS. 6–9 illustrate examples of character feature extraction.
Figure 7:
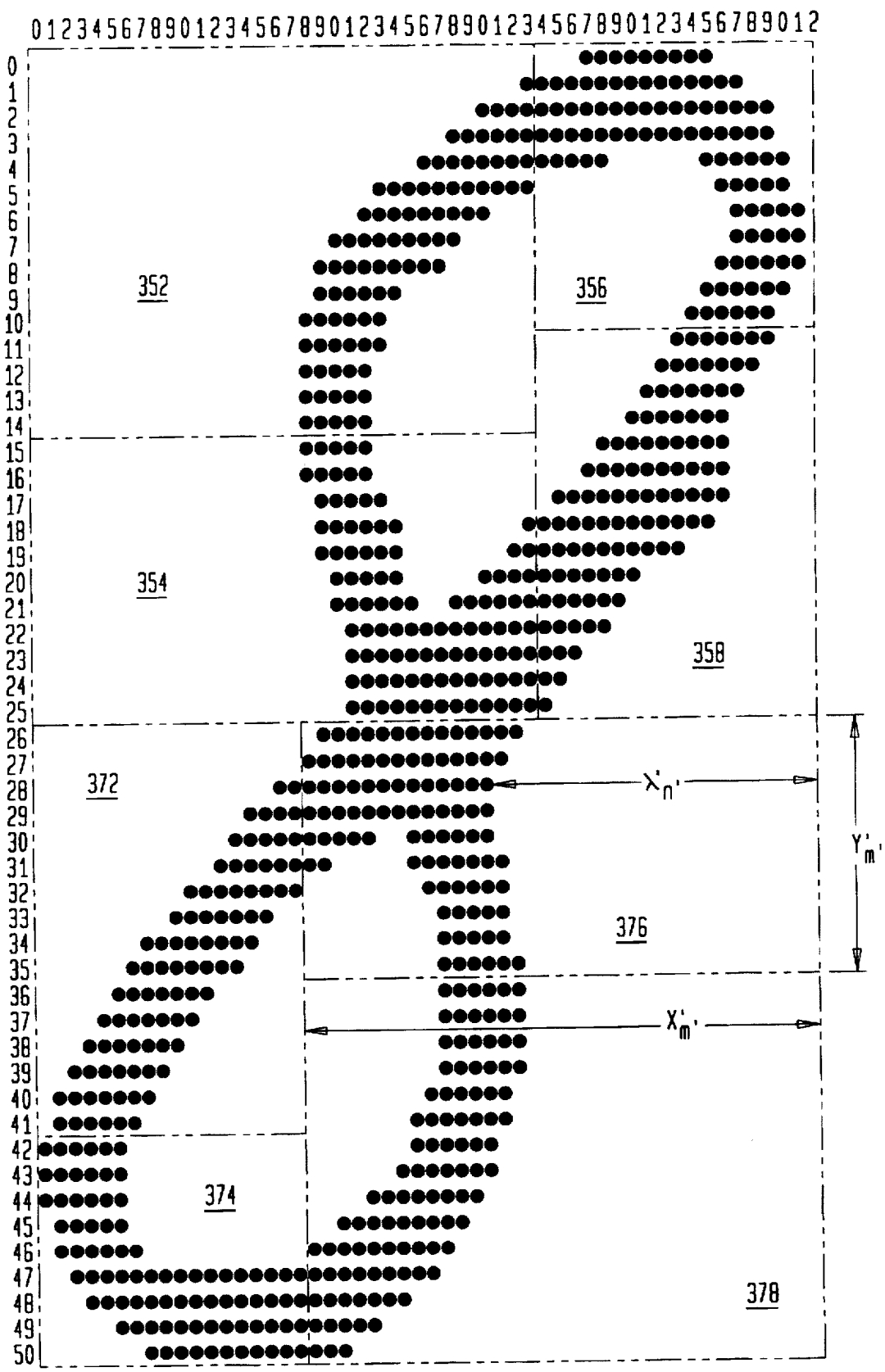
Figure 8:
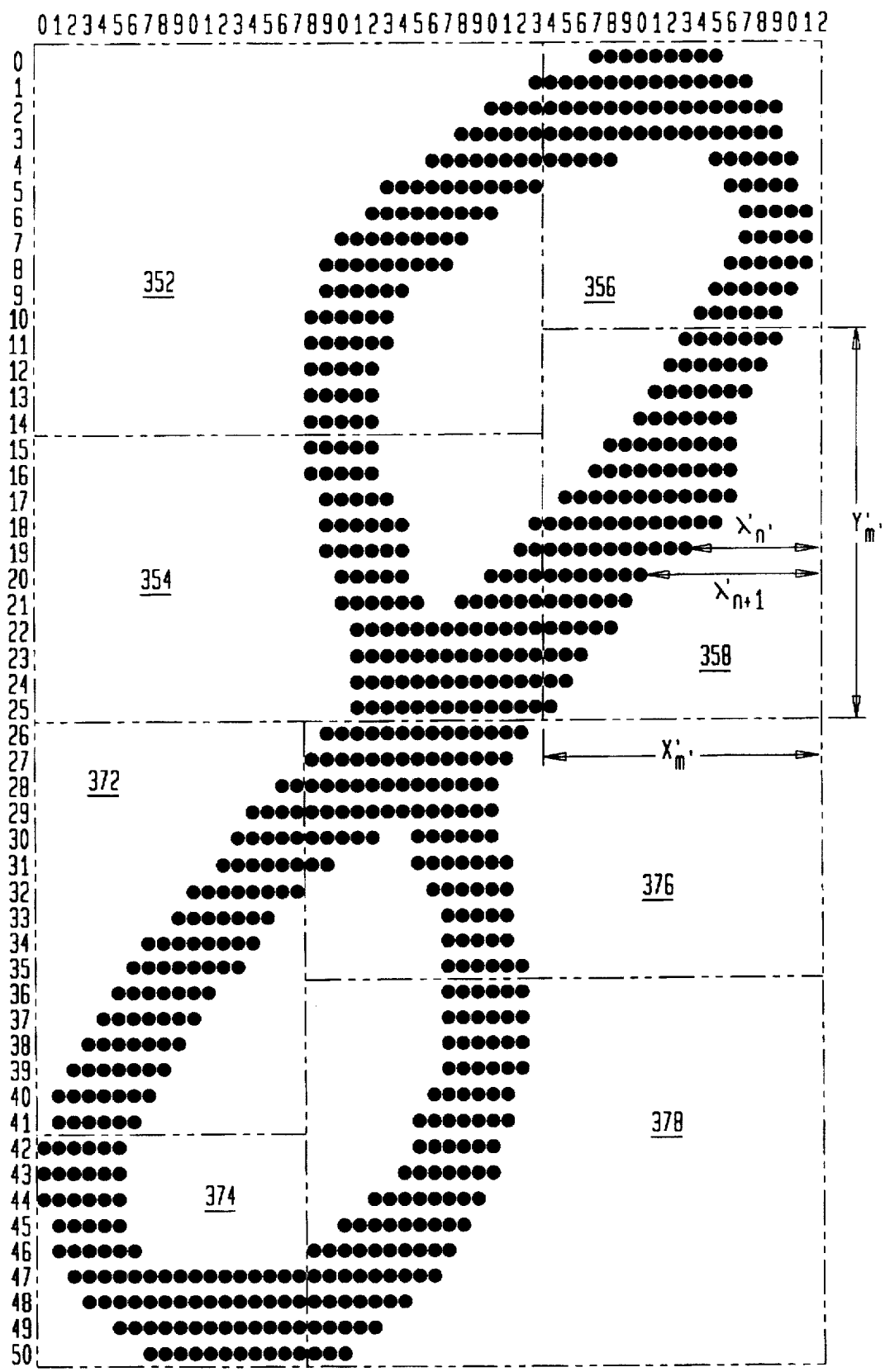
Figure 9A:
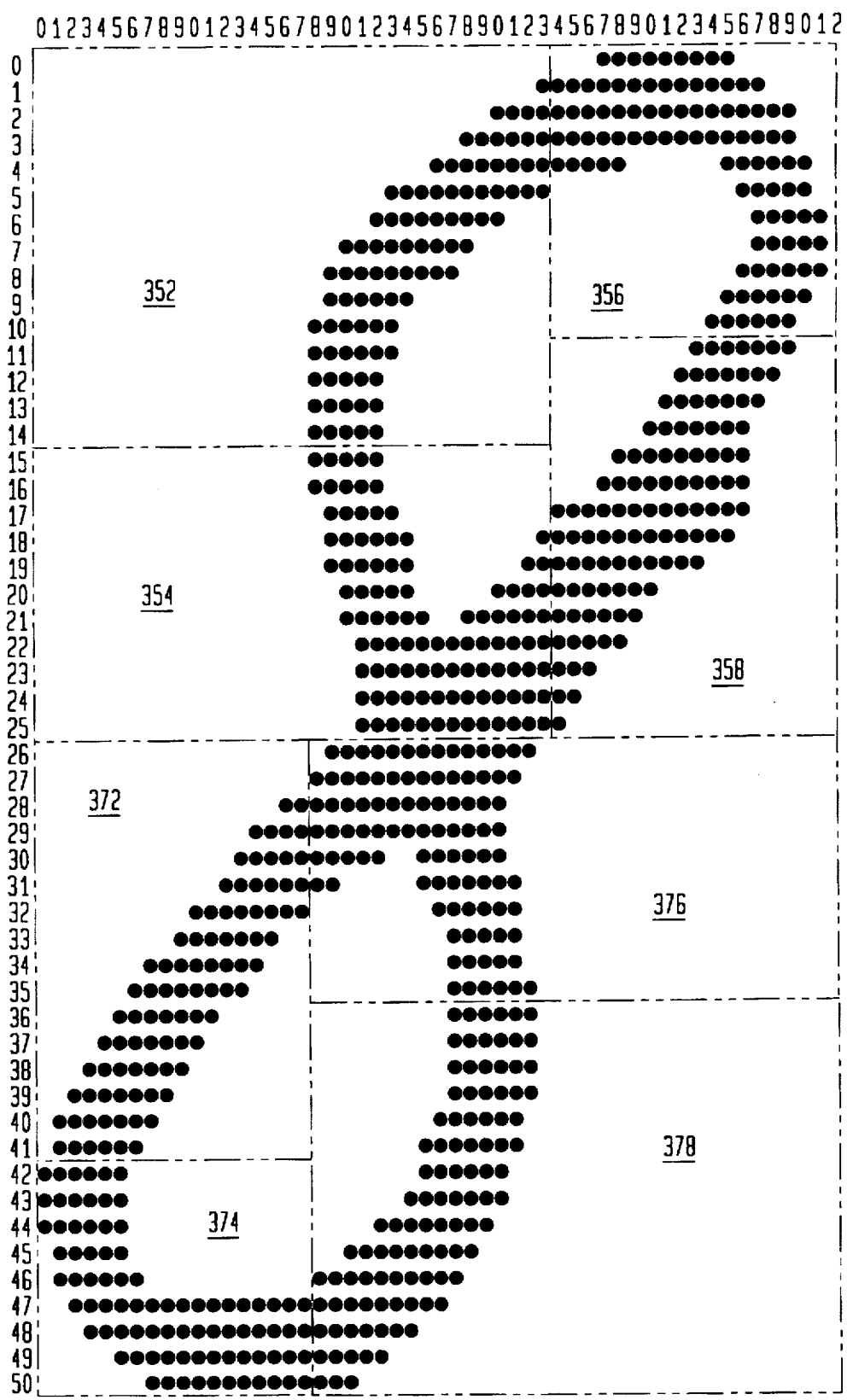
Figure 9B:
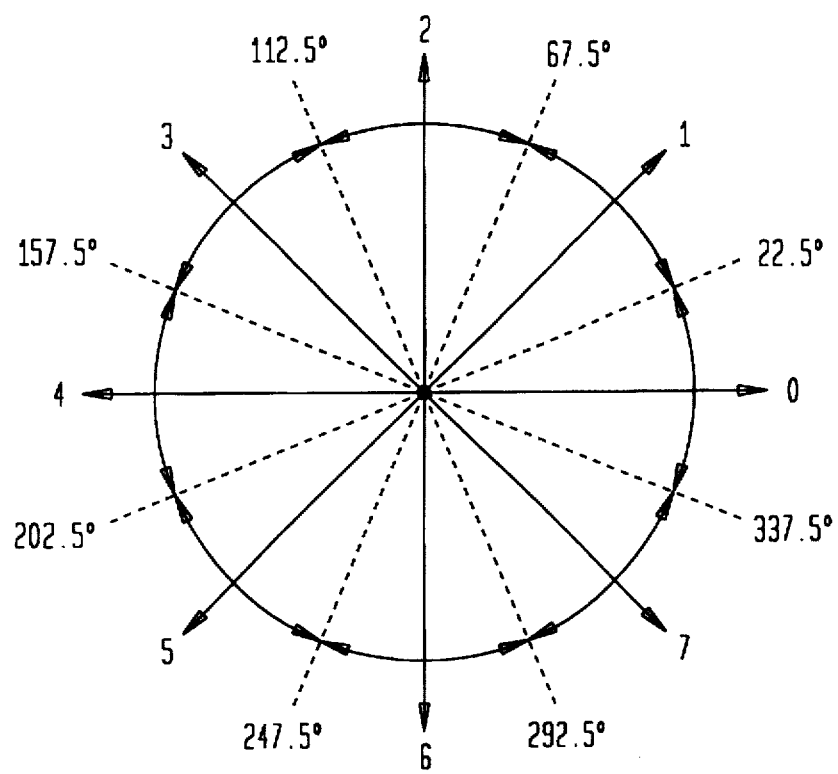
Figure 10:
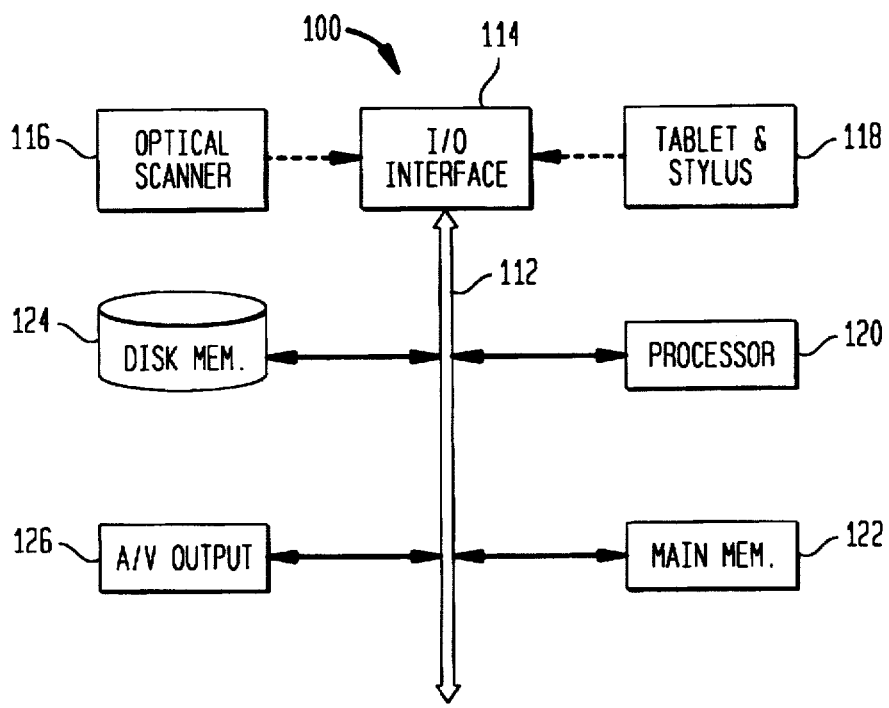
FIG. 10 illustrates a system for recognizing characters according to an embodiment of the present invention.

FIG. 10 illustrates a system 100 for recognizing characters inputted thereto. Like the system 10, the system 100 has an I/O interface 114 connected to a character input device such as an optical scanner 116, or a stylus and writing tablet 118, or both. The optical scanner 16 is capable of scanning in sheets on which machine printed or handwritten characters were previously formed and generating graphical image data of the inputted characters therefrom. The stylus and writing tablet 118 are capable of receiving handwritten characters which are manually inputted therewith and generating graphical image data of the inputted characters therefrom. The generated data may be transferred via the I/O interface 114 and bus 112 to a main memory 122 or disk memory 124. A processor 120 can process the data, in particular, can compare each inputted character to a database of prototypes to determine the best matching prototype. The inputted characters are recognized as the model character corresponding to the best matching prototypes. The recognized model characters then may be outputted via the audio/video output device 126.

Figure 11:
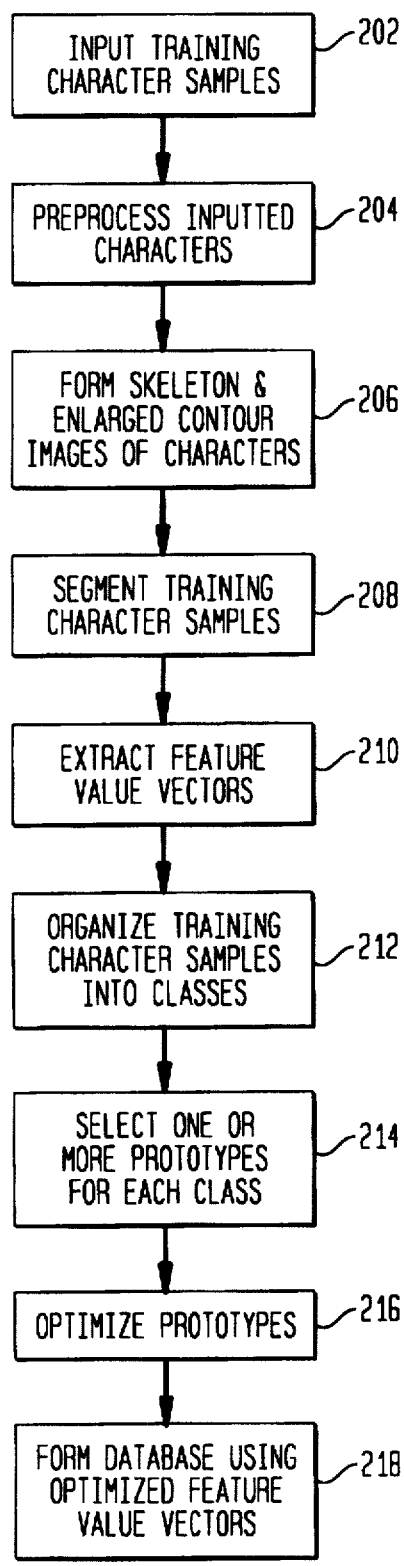
FIG. 11 illustrates a process for constructing a database according to an embodiment of the present invention.

The system 100, or other suitable similar system, is illustratively capable of generating the database of prototypes. Illustratively, this is achieved using a process which is schematically depicted in FIG. 11. According to a first step 202, training character samples are inputted via the optical scanner 116 or tablet and stylus 118. Graphical image data of the training character samples is stored in the memory 122 or 124. The training character sample data is then pre-processed to remove noise, etc., by the processor 120 in step 204. In step 206, the processor 120 forms skeleton images of each training character sample and then converts the skeleton images to enlarged contour images. In step 208, the processor 120 segments the training character samples. In step 210, the processor 120 extracts feature value vectors from each segmented training character sample. In step 212, the processor 120 organizes the training character samples into classes. This can be achieved in a number of ways such as is suggested in U.S. patent application Ser. No. 08/313,686. According to this patent application, the training character samples of each model character are divided into plural classes so as to better organize the training character samples which typically are non-uniformly distributed. Next, in step 214, the processor 120 selects one or more prototypes for each class. These prototypes may be selected by forming the mean feature value vector for each class and assigning the prototype feature value vector thereto. Alternatively, each class may be divided into subclasses and a mean feature value vector may be formed for each subclass. Each mean feature value vector formed for each subclass defines a prototype of the class.

After selecting the prototypes (and prototype feature value vectors), the processor 120 executes step 216 wherein the prototypes are optimized. This is discussed in greater detail below. After optimizing the prototypes, the processor 120 executes step 218 wherein the processor forms the database of prototypes using the prototype feature value vectors as optimized. The database formed in step 218 may be a flat database, may be organized in a tree structure, etc. The optimized database then illustratively is stored in the main memory 122 or the disk memory 124.

An optimization process according to an embodiment of the present invention called the Competetive Classification Learning (CCL) process is now discussed. Certain philosophies, are incorporated into the optimization process according to the invention. In order to explain these philosophies, the following terms are first defined whose meanings are elaborated below:

n is the current iteration number, wherein all training character samples are processed during each iteration n $y^j_k$ is the distance from the $j^{th}$ prototype of the $k^{th}$ class to the training character sample $\theta_i$ is a normalization factor for the feature i $z_k$ is the distance from the prototype of the class k closest to the training character sample J is the total number of prototypes in all classes $B_k$ is the total number of prototypes in the class k.

$B_M$ is the total number of prototypes in the class M $B_I$ is the total number of prototypes in the class I $O_I$ is the distance from the training character sample to the nearest prototype in the class I $O_M$ is the distance from the training character sample to the nearest prototype in the class M.

Unlike LVQ2, the calculation of distance in the CCL process incorporates normalization factors $\theta_i$ for each $i^{th}$ feature. Thus, the weighting of each feature varies from feature to feature in the distance calculation. The distance function is defined as follows:

$$y_k^j = \sum_{i=1}^{N} \frac{(x_i - r_{ki}^j)^2}{\theta_i} \quad (8)$$

As will be discussed in greater detail below, each normalization factor is updated whenever I≠M (for a training character sample). The updating ensures that those features which better distinguish characters from each other have a greater contribution in determining the distance between two feature value vectors than those features with a lesser capability of distinguishing characters.

Let E be an error function relating the adjustment of prototypes to the error in selecting the prototypes with respect to the training character sample with feature value vector x. Unlike the LVQ2 process, E is selected in the CCL process to be a non-binary function which depends on the iteration n and the distances $O_I$ and $O_M$ (which are more specifically defined below). Illustratively, E is defined as follows:

$$E = 1 - e^{\frac{O_M - O_I}{A(n)}} \quad (12)$$

where A(n) is a monotonically decreasing bandwidth function which is always greater than 0. That is, A(0) is some initial high value and decreases each iteration n. Stated another way, 0<A(n+1)<A(n). The bandwidth function A(n) is sometimes called the width of the receptive field of the sigmoid function $\exp[(O_M - O_I)/A(n)]$ which governs the active area of the sigmoid function. It should be noted that when $O_I = O_M$, E=0 because no error exists in the prototypes with regard to the specific training character sample (the nearest class to the training character sample is the true class I). However, when $O_M < O_I$, E indicates an increment of error in the prototype selection. When A(n) approaches 0, E can be estimated as a binary function as in LVQ2, i.e., E=0 implies that $O_I = O_M$ and E=1 implies that $O_I \neq O_M$. Thus, LVQ2 can be thought of using a special case of E where A(n) approaches 0.

The CCL process uses the minimization of E as a basis for updating prototype feature value vectors and the normalization factors. Thus define the following iterative updating parameters:

$$\Delta r_{ki}^j = -\alpha(n) \frac{\partial E}{\partial r_{ki}^j} \quad (13)$$

and $$\Delta \theta_i = -\beta(n) \frac{\partial E}{\partial \theta_i} \quad (14)$$

where α(n) and β(n) are monotonically decreasing learning rate functions. That is, α(n) and β(n) are chosen such that α(n+1)<α(n) and β(n+1)<β(n). Such learning rate functions are decided based on experimentation (in a similar fashion that the function or constant α is decided in LVQ2). The functions α(n) and β(n) are illustratively chosen to suit the kinds of model characters and features utilized in constructing the database of the character recognition system.

Applying the chain rule to equation (13) produces $$\frac{\partial E}{\partial r_{ki}^j} = \sum_{k=1}^{K} \frac{\partial E}{\partial z_k} \frac{\partial z_k}{\partial r_{ki}^j}$$

The first part may be rewritten as:

$$\frac{\partial E}{\partial z_k} = \begin{cases} -\frac{1}{A(n)} e^{\frac{O_M - O_I}{A(n)}}, & \text{when } O_I \neq O_M \text{ and } k = M \\ \frac{1}{A(n)} e^{\frac{O_M - O_I}{A(n)}}, & \text{when } O_I \neq O_M \text{ and } k = I \\ 0, & \text{otherwise} \end{cases}$$

Likewise, the second part may be reduced using the chain rule to $$\frac{\partial z_k}{\partial r_{ki}^j} = \frac{\partial z_k}{\partial y_k^j} \frac{\partial y_k^j}{\partial r_{ki}^j}$$

The first derivative becomes $$\frac{\partial z_k}{\partial y_k^j} = \begin{cases} 1, & \text{when } y_k^j = \min_{p=1}^{B_k} y_k^p \\ 0, & \text{otherwise} \end{cases}$$

where p is an index which takes on each value from 1 to $B_k$. The second derivative is $$\frac{\partial y_k^j}{\partial r_{ki}^j} = \frac{2 \cdot (x_i - r_{ki}^j)}{\theta_i}$$

Combining the above derivatives with equation (13) yields:

$$\Delta r_{ki}^j = \quad (15)$$

$$\begin{cases} -\eta(n) e^{\frac{O_M - O_I}{A(n)}} \frac{1}{\theta_i} (x_i - r_{ki}^j), & \text{when } O_I \neq O_M, y_k^j = \min_{p=1}^{B_k} y_k^p \text{ and } k = M \\ \eta(n) e^{\frac{O_M - O_I}{A(n)}} \frac{1}{\theta_i} (x_i - r_{ki}^j), & \text{when } O_I \neq O_M, y_k^j = \min_{p=1}^{B_k} y_k^p \text{ and } k = I \\ 0 & \text{otherwise} \end{cases}$$

where $$\eta(n) = \frac{2 \cdot \alpha(n)}{A(n)}$$

Using similar reasoning in equation (14):

$$\frac{\partial E}{\partial \theta_i} = \sum_{k=1}^{K} \frac{\partial E}{\partial z_k} \frac{\partial z_k}{\partial \theta_i}$$

$$\frac{\partial z_k}{\partial \theta_i} = \sum_{j=1}^{B_k} \frac{\partial z_k}{\partial y_k^j} \frac{\partial y_k^j}{\partial \theta_i}$$

and $$\frac{\partial y_k^j}{\partial \theta_i} = \frac{(x_i - r_{ki}^j)^2}{\theta_i^2}$$

Therefore, equation (14) may be rewritten as:

$$\Delta \theta_i = \begin{cases} \mu(n) e^{\frac{O_M - O_I}{A(n)}} \frac{(x_i - r_{Ii}^I)^2 - (x_i - r_{Mi}^M)^2}{\theta_i^2}, & \text{when } O_I \neq O_M \\ 0, & \text{otherwise} \end{cases} \quad (16)$$

where $$\mu(n) = \frac{\beta(n)}{A(n)}$$

To ensure the convergence of the prototype optimization process, $\eta(n)$ and $\mu(n)$ are chosen to be monotonically decreasing functions.

Figure 12:
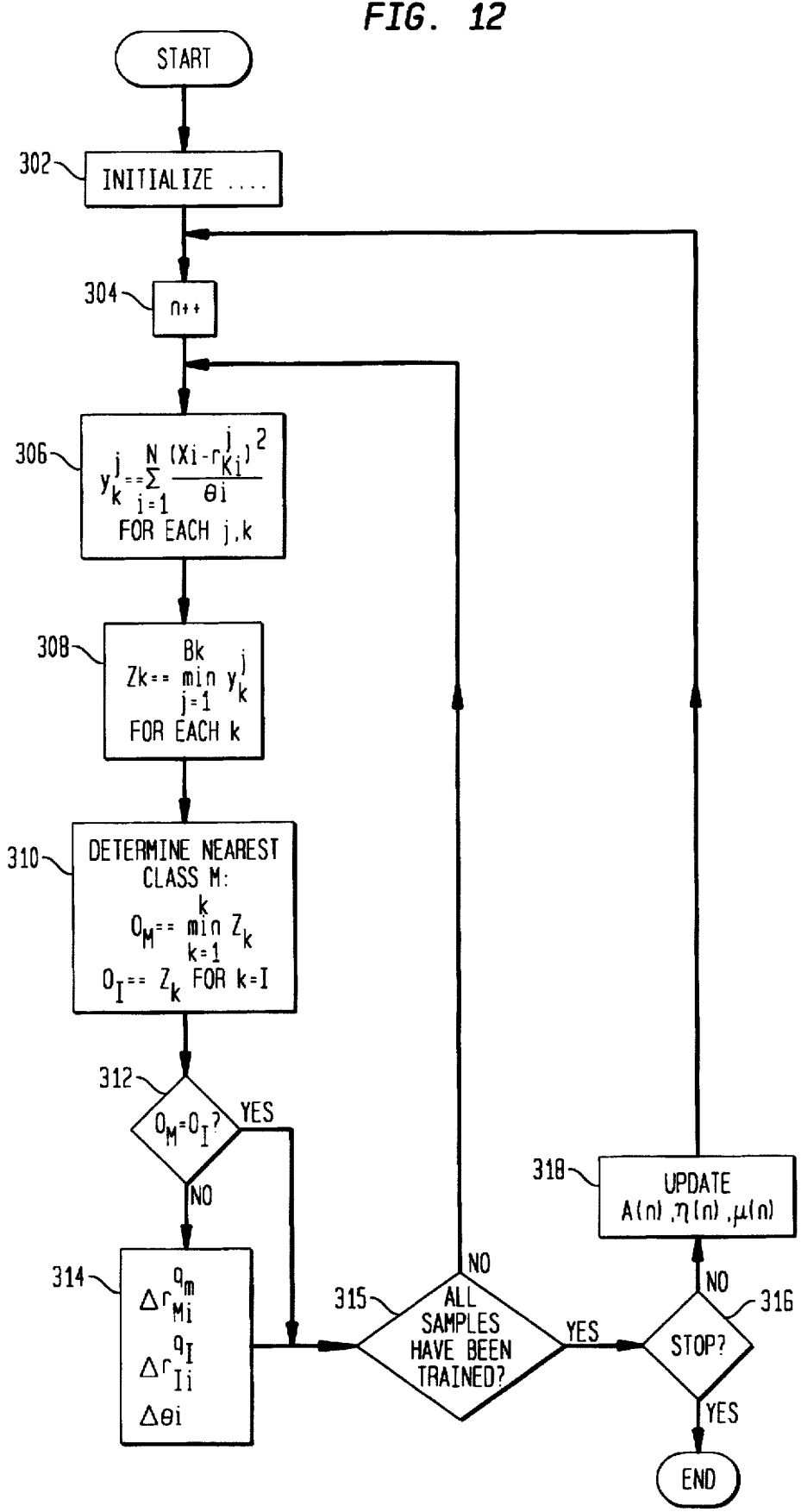
FIG. 12 illustrates a process for optimizing prototypes according to an embodiment of the present invention.

Equations (15) and (16) are the prototype and normalization factor updating functions and equation (12) is the distance calculation function used in the optimization process according to an embodiment of the invention. Referring to FIG. 12, the CCL optimization process is now discussed. In step 302, the processor 120 intializes certain parameters including each normalization factor $\theta_i$, the initial value of the bandwidth parameter A(0) and the initial values $\eta(0)$ and $\eta(0)$ of the functions $\eta(n)$ and $\mu(n)$. The values error (the error counter) and n (the iteration counter) are set equal to 0. The processor 120 also selects the first training character sample for processing. Next, the processor 120 performs each of steps 304-318 for each training character sample. In step 304, the processor 120 increases the iteration counter n by 1. In step 306, the processor 120 determines the distance $y_k^j$ between x and each $j^{th}$ prototype (where j takes on the values from 1 to $B_k$ and k takes on the values from 1 to K) as per equation (8). Next, in step 308, the processor 120 determines the nearest $q_k^{th}$ prototype of each class k to the training character sample. In so doing, the processor 120 evaluates the following equation for each class k=1 to K:

$$z_k = \min_{j=1}^{B_k} y_k^j \quad (9)$$

In step 310, the processor 120 determines which of the classes k is the nearest class M, i.e., contains the prototype with the smallest distance $z_k$ to the training character sample. The processor 120 sets the distance to the nearest prototype $O_M$ equal to this smallest $z_k$ and M equal to the value of k for which $z_k$ is minimized. The processor 120 also sets the distance to the nearest prototype of the true class $O_I$ equal to the smallest distance $z_k$ for the class k=I. Stated another way, the processor 120 performs the following assignments:

$$O_M = y_M^{q_M} = \min_{j=1}^{B_M} \sum_{i=1}^{N} \frac{(X_i - r_{Mi}^I)^2}{\theta_i} = \min_{k=1}^{K} z_k \quad (9a)$$

$$O_I = y_I^{q_I} = \min_{j=1}^{B_I} \sum_{i=1}^{N} \frac{(x_i - r_{Ii}^I)^2}{\theta_i} = z_I \quad (9b)$$

In step 312, the processor compares $O_I$ and $O_M$. If $O_I = O_M$, then no prototypes are updated for this training character sample. The processor 120 thus branches to step 315. However, if $O_I \neq O_M$ then the processor 120 presumes that I≠M. In such a case, the processor 120 executes step 314. In step 314, the processor 120 updates both the nearest prototype feature value vector $r^{qM}_M$ in the nearest class M and the nearest prototype feature vector $r^{qI}_I$ in the true class I of the training character sample according to equation (15), i.e.:

$$\Delta r_{Mi}^M = -\eta(n) e^{\frac{O_M - O_I}{A(n)}} \frac{(x_i - r_{Mi}^M)}{\theta_i} \quad (10a)$$

$$\Delta r_{Ii}^I = \eta(n) e^{\frac{O_M - O_I}{A(n)}} \frac{(x_i - r_{Ii}^I)}{\theta_i} \quad (10b)$$

for each value of i. Furthermore, the processor 120 updates each normalization factor $\theta_i$ according to equation (16). The processor 120 also increases error by one. The processor 120 then executes step 315.

In step 315, the processor 120 determines whether or not all of the samples have been trained. That is, the processor 120 determines if the most recently processed training character sample is the last training character and if $O_M = O_I$ for this training character sample. If so, execution in the processor proceeds to step 316. If $O_M = O_I$ but the most recently processed training character sample was not the last training character sample, the processor 120 selects the next training character sample for processing. The processor 120 then returns to step 306. If $O_M \neq O_I$, the processor 120 simply returns to step 306 without changing the currently processed training character sample.

In step 316, the processor 120 determines whether or not to stop executing steps 304-318 or whether to branch execution back to step 304. The processor 120 may cease execution as a natural consequence of iterating successfully through all of the training character samples. Alternatively, the processor 120 may prematurely cease execution if the value of error exceeds a predetermined threshold error__threshold or if the iteration counter n exceeds a predetermined threshold n__threshold. If none of these conditions are true, the processor executes step 318 wherein A(n), $\eta(n)$ and $\mu(n)$ are reduced. The processor 120 then returns to step 104.

Note that the updating of the prototypes produced by equations (15), (10a) and (10b) is controlled by two terms, namely, $x_i - r'_{ki}$ and $\exp[(O_M - O_I)/A(n)]$. The first term causes the updating to be proportional to the distance separating the prototype feature value $r'_{ki}$ and the corresponding training character sample feature value $x_i$. However, the second term causes the updating to depend on the bandwidth parameter A(n) on the one hand and the value $O_M - O_I$ on the other hand. The bandwidth parameter provides that the updating be in accordance with the minimization of the error in selecting the prototypes. Specifically, the bandwidth parameter ensures that large changes to the prototypes are less likely with increasing iterations n. Intuitively, since the prototypes are converging towards their optimal values with each successive iteration, it is desirable to prevent large changes to the prototypes as n increases. As noted above, A(n) is a monotonically decreasing function. Thus, as n increases, the update produced by a given $O_M$ and $O_I$ decreases.

Furthermore, the dependence of the updating on the value $O_M - O_I$ minimizes the change to the prototypes produced by abnormal training character samples. An update occurs whenever $O_M \neq O_I$. However, the magnitude of the update increases as the value of $O_M$ approaches the value of $O_I$ and decreases as the value of $O_M$ deviates from the value of $O_I$. This is a desirable outcome. When $O_M$ is substantially different from $O_I$ then a training character sample is much closer to the nearest prototype of the wrong class M than to the nearest prototype of the true class I. When this occurs, the training character sample is considered to be abnormal and unsuitable for character recognition. The updating criteria of equations (15), (10a) and (10b) minimize the change to the prototypes caused by such abnormal training character samples.

Note also that equation (8), which is evaluated to determine the distance between a training character sample feature value vector x and a prototype $r^j{}_k$, incorporates a normalization factor $\theta_i$ for each $i^{th}$ feature. Thus, the features are weighted differently. In particular, equation (16) controls the updating of each $i^{th}$ feature in proportion to $(x_i - r^{qI}{}_{Ii})^2 - (x_i - r^{qM}{}_{Mi})^2$. When $(x_i - r^{qI}{}_{Ii})^2$ is larger than $(x_i - r^{qM}{}_{Mi})^2$, then the normalization factor $\theta_i$ of the $i^{th}$ feature is increased. This in turn reduces the contribution of the $i^{th}$ feature in the determination of distance. On the other hand, when $(x_i - r^{qI}{}_{Ii})^2$ is smaller than $(x_i - r^{qM}{}_{Mi})^2$, then the normalization factor $\theta_i$ of the $i^{th}$ feature is decreased. This in turn increases the contribution of the $i^{th}$ feature in the determination of distance.

Consider the implications of equations (8) and (16). Normalization factors are not updated unless M≠I. Suppose that on a particular iteration for a given training character sample, M≠I. Furthermore, suppose that $(x_i - r^{qI}{}_{Ii})^2$ is larger than $(x_i - r^{qM}{}_{Mi})^2$. This means that the $i^{th}$ feature value $x_i$ of the training character sample is more distant from the corresponding feature value $r^{qI}{}_{Ii}$ of the prototype of the true class I, than the corresponding feature value $r^{qM}{}_{Mi}$ of the prototype of the nearest class M. This implies that the $i^{th}$ feature poorly distinguishes characters because the $i^{th}$ feature causes the training character sample to be closer to a prototype of the wrong class M than the true class I. Thus, the contribution of this feature in determining the distance between feature value vectors is reduced by increasing the corresponding normalization factor $\theta_i$. On the other hand, suppose that $(x_i - r^{qI}{}_{Ii})^2$ is smaller than $(x_i - r^{qM}{}_{Mi})^2$. This means that the $i^{th}$ feature value $x_i$ of the training character sample is closer to the corresponding feature value $r^{qI}{}_{Ii}$ of the prototype of the true class I, than the corresponding feature value $r^{qM}{}_{Mi}$ of the prototype of the nearest class M. This implies that the $i^{th}$ feature distinguishes characters well because the $i^{th}$ feature causes the training character sample to be closer to a prototype of the true class I than a prototype of the wrong class M. Thus the contribution of this feature in determining the distance between feature value vectors is increased by decreasing the corresponding normalization factor $\theta_i$.

The CCL optimization process according to the present invention provides a superior database of prototypes for use in recognizing characters. The following table summarizes the improvement of the present invention.

| Approach | Char. No. | $B_k$ | Error (Total) | Rate |
|---|---|---|---|---|
| K_means | 50 | 1 | 151 (5000) | 96.98% |
| LVQ2 | 50 | 1 | 99 (5000) | 98.02% |
| CCL | 50 | 1 | 75 (5000) | 98.50% |
| K_means | 50 | 2 | 108 (5000) | 97.84% |
| LVQ2 | 50 | 2 | 76 (5000) | 98.48% |
| CCL | 50 | 2 | 54 (5000) | 98.92% |
| K_means | 200 | 1 | 1226 (20600) | 93.87% |
| LVQ2 | 200 | 1 | 760 (20000) | 96.20% |
| CCL | 200 | 1 | 580 (20000) | 97.10% |
| K_means | 200 | 2 | 949 (20000) | 95.25% |
| LVQ2 | 200 | 2 | 623 (20000) | 96.88% |
| CCL | 200 | 2 | 540 (20000) | 97.30% |
| K_means | 400 | 1 | 3321 (40000) | 91.70% |
| LVQ2 | 400 | 1 | 2031 (40000) | 94.92% |
| CCL | 400 | 1 | 1639 (40000) | 95.91% |

In the table above, $B_k$ is the number of prototypes per class, and Char. No. is the number of different model characters that can be recognized. In each case, 200 character samples are inputten for each model character including 100 training character samples and 100 testing character samples per model character. Despite the optimization approach used, not all training character samples will be nearest to their respective true class. Error is the total number of testing character samples that were not deemed to be nearest to their true class prototypes despite the optimization. As noted in the table, the CCL optimization process according to the present invention provides for a higher accuracy in recognizing characters. That is, fewer testing character samples are deemed to be closer to prototypes of classes other than their true class after the optimization process according to the invention. Therefore, the CCL optimization process constructs better optimized prototypes with less classification error.

Figure 13:
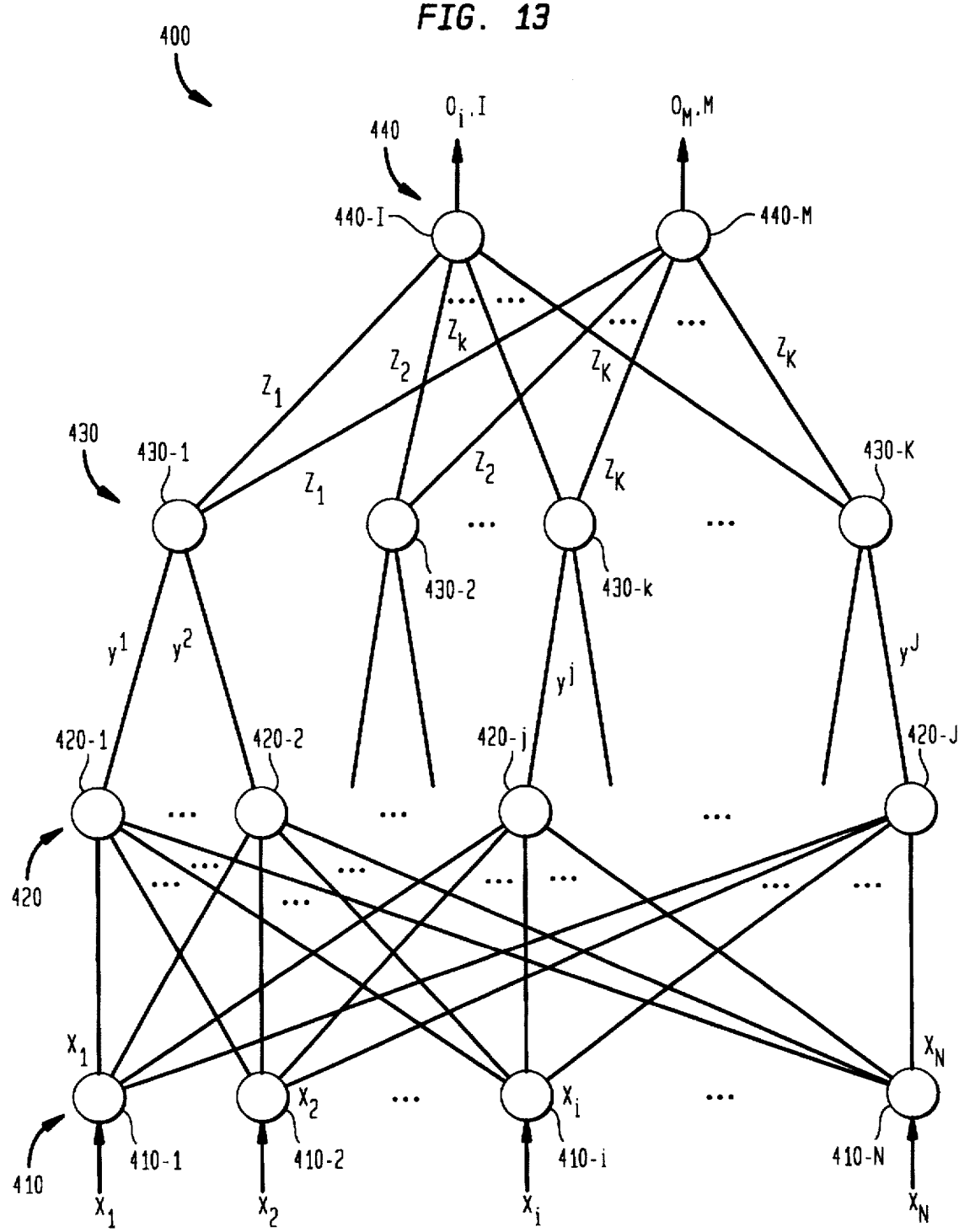
FIG. 13 illustrates a neural network processor according to an embodiment of the present invention.

Referring to FIG. 13, a neural network processor 400 is illustrated for use in performing the optimization process discussed above. Such a neural network processor 400 may be incorporated into the processor 120 of FIG. 10. Alternatively, if the processor 120 is a pre-assembled microprocessor, the neural network processor 400 may be connected to the processor 120 and memories 122 and 124 via the bus 112.

Illustratively, the neural network processor 400 is hierarchically organized into four layers 410, 420, 430 and 440. The lowest layer 410 is referred to as the input layer. The input layer 410 includes N processing nodes 410-1, 410-2, . . . , 410-i, . . . , 410-N, where N is the total number of features. Each input layer processing node 410-i corresponds to a different $i^{th}$ feature. The next layer 420 is referred to as the first hidden layer 420. The first hidden layer 420 has J processing nodes 420-1, 420-2, . . . , 420-j, . . . , 420-J where J is the total number of prototypes over all classes. Each first hidden layer processing node 420-j corresponds to a different $j^{th}$ prototype. Each first hidden layer processing node 420-j is connected to each of the N input layer processing nodes 410-1, . . . , 410-N. The next layer 430 is referred to as the second hidden layer 430. The second hidden layer 420 has K processing nodes 430-1, 430-2, . . . , 420-k, . . . , 420-K where K is the total number of classes. Each second hidden layer processing node 430-k corresponds to a different $k^{th}$ class. Each second hidden layer processing node 430-k is connected to only those $B_k$ first hidden layer processing nodes 420-j corresponding to prototypes of the corresponding $k^{th}$ class. Finally, the layer 440 is referred to as the output layer. The output layer has two processing nodes 440-1 and 440-M. The processing node 440-I corresponds to the true class I of a training character sample processed by the neural network processor 400. The processing node 440-M corresponds to the nearest class M of the training character sample processed by the neural network processor 400.

The feature value vector of each training character sample may be inputted to the neural network processor 400. Specifically, the feature value of each $i^{th}$ feature is inputted to the corresponding input layer processing node 410-1, . . . , 410-N, the i=1$^{st}$ feature value being inputted to the input layer processing node 410-1, the i=2$^{nd}$ feature value being inputted to the input layer processing node 410-2, etc. The input layer processing nodes 410-1, . . . , 410-N output their feature values, in parallel, to each of the first hidden layer processing nodes 420-1, . . . , 420-J.

Each $j^{th}$ first hidden layer processing node 420-j determines the distance $y^j$ between the prototype feature value vector corresponding to the $j^{th}$ first hidden layer processing node and the inputted training character sample feature value vector x according to equation (8). That is, the j=1$^{st}$ first hidden layer processing node 420-1 determines the distance $y^1$ between the j=1$^{st}$ prototype feature value vector and the inputted training character sample feature value vector x, the $j=2^{nd}$ first hidden layer processing node 420-2 determines the distance $y^2$ between the $j=2^{nd}$ prototype feature value vector and the inputted training character sample feature value vector x, etc. The first hidden layer processing nodes 420-1, ..., 420-J output the distances $y^1, \ldots, y^J$ thus determined to only the second hidden layer processing nodes 430-k of the corresponding $k^{th}$ class. For instance, suppose that $B_k=3$ prototypes are selected for each class such that prototypes j=1–3 corresponds to class k=1, prototypes j=4–6 correspond to class 2, etc. In this case, first hidden layer processing nodes 420-1, 420-2 and 420-3 (corresponding to prototypes j=1–3) output their distances to second hidden layer processing node 430-1 (corresponding to class k=1), first hidden layer processing nodes 420-4, 420-5 and 420-6 (corresponding to prototypes j=4–6) output their distances to second hidden layer processing node 430-2 (corresponding to class k=2), etc.

Each $k^{th}$ second hidden layer processing node 430-k receives the $B_k$ distances corresponding to the prototypes of the respective $k^{th}$ class and selects the smallest distance $z_k$ by evaluating equation (9). This distance is the distance of the nearest prototype of the class k to the training character sample. Each $k^{th}$ second hidden layer processing node 430-1, ..., 430-K then outputs, in parallel, the minimum distance $z_k$ to both of the output layer processing nodes 440-I and 440-M.

The processing node 440-M receives each minimum distance $z_k$ outputted from the second hidden layer processing nodes 430-1, ..., 430-K and selects the smallest distance $z_k$. This selected distance $z_k$ is the distance from the training character sample to the nearest prototype of the nearest class M. The processing node 440-M thus outputs the selected distance $z_k$ as the value $O_M$ and the class M corresponding to the second hidden processing node 430-k, for k=M, which outputted the smallest distance $z_k=O_M$.

The processing node 440-I receives each minimum distance $z_k$ outputted from the second hidden layer processing nodes 430-1, ..., 430-K and selects the distance $z_k$ corresponding to the true class k=I. The selected distance is the distance from the training character sample to the nearest prototype of the true class I. The processing node thus outputs I (which is known ahead of time for each training character sample) and the selected distance $z_k$ for k=I as the value $O_I$.

Thus, the neural network processor 400 quickly and efficiently determines $O_M$, $O_I$, M and I for each inputted training character sample using a highly parallel architecture. As above, if $O_I \neq O_M$, then prototype feature value vectors and normalization factors may be updated (e.g., using a suitable processor such as the processor 120). These updated values are then loaded into the appropriate first hidden layer processing nodes 420-1, ..., 420-J. It should be noted that the processing nodes of each layer 410–440 may be optimized to perform their specified task at high speed and using minimal IC chip area.

In short, a system and process for performing character recognition is disclosed. Training character samples are inputted and classified for purposes of generating prototypes therefrom. The present invention provides an optimization process for updating the prototypes, to improve the recognition capabilities of the prototypes. The updating is performed in accordance with the following criterion:

(1) The prototype feature value vectors are updated by only small amounts for abnormal prototypes that are much closer to the nearest class M than to the true class I. This is achieved by reducing the amount of the update with increasing relative distances between $O_M$ (distance between the nearest prototype of the nearest class and the training character sample) and $O_I$ (distance between the nearest prototype of the true class I of the training character sample).

(2) The updating of the prototype feature value vectors is performed so as to minimize an error in the selection of the prototypes. The updating of prototypes is influenced by the monotonically decreasing function A(n) which, for a given $O_M$ and $O_I$, reduces the amount of the updating of the prototypes each successive iteration n.

(3) The distance between a training character sample and a prototype is determined so that features which better distinguish one character from another have a greater weight in determining the distance than those features which do not distinguish one character from another as well. To that end, each $i^{th}$ feature is weighted by a different normalization factor $\theta_i$. The normalization factors are adjusted whenever $O_M \neq O_I$ so as to increase the contribution of those features for which $(x_i - r^{qI}_{Ii})^2 < (x_i - r^{qM}_{Mi})^2$ and to decrease the contribution of those features for which $(x_i - r^{qI}_{Ii})^2 > (x_i - r^{qM}_{Mi})^2$ where:

$(x_i - r^{qI}_{Ii})^2$ is the contribution of the $i^{th}$ feature to the distance between the training character sample and the nearest prototype of the true class I, and $(x_i - r^{qM}_{Mi})^2$ is the contribution of the $i^{th}$ feature to the distance between the training character sample and the nearest prototype of the nearest class M.

Finally, the above discussion is intended to be merely illustrative of the invention. Numerous alternative embodiments may be devised by those having ordinary skill in the art without departing from the spirit and scope of the following claims.

The claimed invention is:

1. A method for optimizing prototypes of model characters for character recognition, said prototypes including at least one prototype feature value vector selected for each true class I into which inputted training character samples, of said model characters, are organized, said method comprising the step of:

for each training character sample, iteratively:
  using a processor, electronically determining the nearest class M containing the nearest prototype to said training character sample,
  using said processor, if said nearest class M is different from said true class I of said training character sample, electronically updating the value of at least some of said prototypes by a value which depends on:

$$e^{\frac{(O_M - O_I)}{A(n)}}$$

where:

n is the iteration number, $O_M$ is the distance from said training character sample to said nearest prototype of said nearest class M, $O_I$ is the distance from said training character sample to the nearest prototype of said true class I, and A(n) is a monotonically decreasing bandwidth parameter such that $0 < A(n+1) < A(n)$ for all n.

2. The method of claim 1 wherein each of said training character samples has a feature value vector x comprising feature values $x_i$ where i is an index that takes on a value from 1 to the maximum feature index N, said step of determining further comprising the step of:

using said processor, electronically determining the distance $y^j_k$ between said training character sample feature value vector x and each $j^{th}$ prototype feature value vector $r^j_k$ of each $k^{th}$ class, where k takes on a value from 1 to the maximum class index K, by evaluating:

$$y^j_k = \sum_{i=1}^{N} \frac{(x_i - r^j_{ki})^2}{\theta_i}$$

where $\theta_i$ is a normalization factor associated with said $i^{th}$ feature.

3. The method of claim 1 wherein said step of updating further comprises the step of:

using said processor, electronically updating each of said normalization factors $\theta_i$ by:

$$\Delta\theta_i = \mu(n) \cdot e^{\frac{O_M - O_I}{A(n)}} \cdot \frac{(x_i - r^{qI}_{Ii})^2 - (x_i - r^{qM}_{Mi})^2}{\theta_i^2}$$

where $\mu(n)$ is a monotnonically decreasing function which depends on $A(n)$.

4. A method for optimizing prototypes of model characters for character recognition, said prototypes including at least one prototype feature value vector selected for each true class I into which inputted training character samples, of said model characters, are organized said method comprising the step of:

for each training character sample, iteratively:
using a processor, electronically determining the nearest class M containing the nearest prototype to said training character sample,
using said processor, if said nearest class M is different from said true class I of said training character sample, electronically updating the value of at least some of said prototypes by a value which depends on:

$$e^{\frac{(O_m - O_I)}{A(n)}}$$

where:

n is the iteration number, $O_M$ is the distance from said training character sample to said nearest prototype of said nearest class M, $O_I$ is the distance from said training character sample to the nearest prototype of said true class I, and $A(n)$ is a monotonically decreasing bandwidth parameter such that $0 < A(n+1) < A(n)$ for all n, and further wherein each of said training character samples has a feature value vector x comprising feature values $x_i$, and wherein said step of updating updates each $i^{th}$ feature value $r^{qM}_{Mi}$ of said feature value vector $r^{qM}_M$ of said $q_M^{th}$ prototype feature value vector of said class M by the value:

$$\Delta r^{qM}_{Mi} = -\eta(n) \cdot e^{\frac{O_M - O_I}{A(n)}} \cdot \frac{x_i - r^{qM}_{Mi}}{\theta_i}$$

and updates each $i^{th}$ feature $r^{qI}_{Ii}$ value of said feature value vector $r^{qI}_I$ of said $q_I^{th}$ nearest feature value vector of said class I by the value $$\Delta r^{qI}_{Ii} = \eta(n) \cdot e^{\frac{O_M - O_I}{A(n)}} \cdot \frac{x_i - r^{qI}_{Ii}}{\theta_i}$$

where:

$\eta(n)$ is a monotonically decreasing function which depends on $A(n)$, $\theta_i$ is a normalization factor associated with said $i^{th}$ feature.

5. A method for optimizing prototypes of model characters for character recognition, said prototypes including at least one prototype feature value vector selected for each true class I into which inputted training character samples, of said model characters, are organized, said method comprising the step of:

for each training character sample, iteratively:
using a processor, electronically determining the nearest class M containing the nearest prototype to said training character sample,
using said processor, if said nearest class M is different from said true class I of said training character sample, electronically updating the value of at least some of said prototypes by a value which depends on:

$$e^{\frac{(O_m - O_I)}{A(n)}}$$

where:

n is the iteration number, $O_M$ is the distance from said training character sample to said nearest prototype of said nearest class M, $O_I$ is the distance from said training character sample to the nearest prototype of said true class I, and $A(n)$ is a monotonically decreasing bandwidth parameter such that $0 < A(n+1) < A(n)$ for all n, and wherein each of said training character samples has a feature value vector x comprising feature values $x_i$ where i is an index that takes on a value from 1 to the maximum feature index N, said step of determining further comprising the step of:

using said processor, electronically determining the distance $y^j_k$ between said training character sample feature value vector x and each $j^{th}$ prototype feature value vector $r^j_k$ of each $k^{th}$ class, where k takes on a value from 1 to the maximum class index K, by evaluating:

$$y^j_k = \sum_{i=1}^{N} \frac{(x_i - r^j_{ki})^2}{\theta_i}$$

where $\theta_i$ is a normalization factor associated with said $i^{th}$ feature, and further wherein said step of determining the nearest class M further comprises the step of:

using said processor, electronically selecting, for each class k, the smallest distance $z_k$ of said distances $y^j_k$ wherein each class k comprises $B_k$ prototypes, by evaluating:

$$z_k = \min_{j=1}^{B_k} y^j_k$$

6. The method of claim 5 wherein said step of determining the nearest class M further comprises the step of:

using said processor, determining the distance to the nearest prototype of the nearest class M by evaluating:

$$O_M = \min_{k=1}^{K} z_k$$

and determining the distance to the nearest prototype of the true class I as $Z_k$ for k=I.

7. A system for optimizing prototypes of model characters for character recognition, said prototypes including at least one prototype feature value vector selected for each true class I; said each true class I comprising inputted training character samples, of said model characters, said training character samples, of said model characters being organized into said each true class I; said system comprising:

a processor for, for each training character sample, iteratively, electronically determining the nearest class M containing the nearest prototype to said training character sample, and, if said nearest class M is different from said true class I of said training character sample, electronically updating the value of at least some of said prototypes by a value which depends on:

$$e^{\frac{(O_M - O_I)}{A(n)}}$$

where:

n is the iteration number, $O_M$ is the distance from said training character sample to said nearest prototype of said nearest class M, $O_I$ is the distance from said training character sample to the nearest prototype of said true class I, and A(n) is a monotonically decreasing bandwidth parameter such that 0<A(n+1)<A(n) for all n.

8. A system for optimizing prototypes of model characters for character recognition, said prototypes including at least one prototype feature value vector selected for each true class I into which inputted training character samples, of said model characters, are organized, which training character samples each comprise a feature value vector, said system comprising:

a neural network processor comprising a plurality of interconnected, hierarchically organized layers of processing nodes for iteratively processing each training character sample, one at a time, said neural network processor comprising:

a first hidden layer, comprising a plurality of processing nodes including one node corresponding to each $j^{th}$ prototype of a class k for receiving each feature value $x_i$ of an inputted training character sample feature value vector x and determining a distance $y^j_k$ from said training character sample feature value vector x to a corresponding $j^{th}$ prototype feature value vector $r^j_k$ of a $k^{th}$ class, having prototype feature values $r^j_{ki}$, wherein each of said distances is determined according to:

$$y_k^j = \sum_{i=1}^{N} \frac{(x_i - r_{ki}^j)^2}{\theta_i}$$

where N is the total number of features, $1 \leq I \leq N$, and $\theta_i$ is a normalization factor associated with said $i^{th}$ feature, and wherein a change in $\theta_i$ is determined in part by scaling $\theta_i$ by a monotonically decreasing feature normalization factor weighting function.

9. A system for optimizing prototypes of model characters for character recognition, said prototypes including at least one prototype feature value vector selected for each true class I into which inputted training character samples, of said model characters, are organized, which training character samples each comprise a feature value vector, said system comprising:

a neural network processor comprising a plurality of interconnected, hierarchically organized layers of processing nodes for iteratively processing each training character sample, one at a time, said neural network processor comprising:

a first hidden layer, comprising a plurality of processing nodes including one node corresponding to each $j^{th}$ prototype of a class k for receiving each feature value $x_i$ of an inputted training character sample feature value vector x and determining a distance $y^j_k$ from said training character sample feature value vector x to a corresponding $j^{th}$ prototype feature value vector $r^j_k$ of a $k^{th}$ class, having prototype feature values $r^j_{ki}$, wherein each of said distances is determined according to:

$$y_k^j = \sum_{i=1}^{N} \frac{(x_i - r_{ki}^j)^2}{\theta_i}$$

where N is the total number of features, $1 < i < N$, and $\theta_i$ is a normalization factor associated with said $i^{th}$ feature, and wherein said neural network processor further comprises:

a second hidden layer, comprising a second plurality of processing nodes including one node corresponding to each $k^{th}$ class for receiving only those $B_k$ distances $y^j_k$ to prototypes of the same $k^{th}$ class as said class to which said $k^{th}$ node of said second hidden layer corresponds, and determining the minimum one $z_k$ of said $B_k$ distances $y^j_k$, and an output layer comprising a third plurality of nodes including a first node corresponding to a nearest class M, for determining a distance $O_M$ from said training character sample to the nearest prototype of said nearest class M by determining the minimum distance of said distances $z_k$, and a second node for determining a distance $O_I$ from said training character sample to the nearest prototype of said true class I by selecting said distance $z_k$ for k=I, wherein $B_k$ is the total number of prototypes per class K.

10. The system of claim 9 wherein said neural network processor further comprises:

an input layer, comprising a fourth plurality of processing nodes, including one node corresponding to each $i^{th}$ feature for receiving a corresponding $i^{th}$ training character sample feature value $x_i$.

* * * * *